US012235405B1

(12) United States Patent  
Salvino et al.

(10) Patent No.: US 12,235,405 B1  
(45) Date of Patent: Feb. 25, 2025

(54) EXTRATERRESTRIAL NANOSECOND NEUTRON ANALYSIS AND ASSOCIATED PARTICLE IMAGING

(71) Applicants: Chris Salvino, Scottsdale, AZ (US); Andrew Dummer, Chapel Hill, NC (US)

(72) Inventors: Chris Salvino, Scottsdale, AZ (US); Andrew Dummer, Chapel Hill, NC (US)

(73) Assignee: LUNAR HELIUM-3 MINING, LLC, Scottsdale, AZ (US)

( * ) Notice: Subject to any disclaimer, the term of this patent is extended or adjusted under 35 U.S.C. 154(b) by 0 days.

(21) Appl. No.: 18/648,725

(22) Filed: Apr. 29, 2024

Related U.S. Application Data

(63) Continuation-in-part of application No. 18/406,459, filed on Jan. 8, 2024, now Pat. No. 12,100,580, which is a continuation-in-part of application No. 18/538,102, filed on Dec. 13, 2023, now Pat. No. 12,044,636.

(51) Int. Cl.  
*G01N 23/222* (2006.01)  
*B60K 35/60* (2024.01)  
*G01T 1/167* (2006.01)  
*G01T 3/02* (2006.01)  
*G01V 5/02* (2006.01)  
*G01V 5/22* (2024.01)

(52) U.S. Cl.  
CPC .............. *G01V 5/234* (2024.01); *B60K 35/60* (2024.01); *G01N 23/222* (2013.01); *G01T 1/167* (2013.01); *G01T 3/02* (2013.01); *G01V 5/02* (2013.01); *G01V 5/232* (2024.01); *B60K 2360/48* (2024.01)

(58) Field of Classification Search  
CPC .... G01N 23/22; G01N 23/221; G01N 23/222; G01V 5/234; G01V 5/232  
USPC .................................................. 376/159–170  
See application file for complete search history.

(56) References Cited

U.S. PATENT DOCUMENTS

| | | | | |
|---|---|---|---|---|
| 4,278,882 A * | 7/1981 | Clayton | ............... | G01N 23/222 250/359.1 |
| 4,361,534 A * | 11/1982 | Borsaru | ............... | G01N 23/222 376/163 |
| 4,622,200 A * | 11/1986 | Gold | .................... | G01N 23/222 250/370.07 |
| 5,168,158 A | 12/1992 | McComas et al. | | |
| 5,838,759 A * | 11/1998 | Armistead | ............. | G01V 5/281 378/57 |
| 6,026,135 A * | 2/2000 | McFee | ...................... | G01V 5/02 376/159 |
| 6,791,089 B1 * | 9/2004 | Caffrey | ................ | G01N 23/222 250/358.1 |
| 7,513,371 B2 * | 4/2009 | Gnedenko | ............... | B03B 13/06 376/163 |
| 7,514,694 B2 | 4/2009 | Stephan et al. | | |
| 7,919,758 B2 | 4/2011 | Stephan et al. | | |

(Continued)

*Primary Examiner* — Allen C. Ho  
(74) *Attorney, Agent, or Firm* — Kenneth Altshuler

(57) ABSTRACT

Disclosed is a nanosecond neutron analysis and associated particle imaging system (NNA/API) and gamma ray detector arrangement (arrangement) that uses associative element detection of titanium, iron and oxygen to determine concentrations of ilmenite or other minerals in extra-terrestrial bodies associated with He-3. The arrangement is used with a mobile carrier for mapping out concentrations of likely He-3 regions on the extra-terrestrial body.

18 Claims, 24 Drawing Sheets

(56) References Cited

U.S. PATENT DOCUMENTS

| | | | |
|---|---|---|---|
| 8,330,115 B2 | 12/2012 | Frank | |
| 8,785,864 B2 * | 7/2014 | Ricci | G01V 5/234 |
| | | | 250/367 |
| 8,963,073 B2 * | 2/2015 | Grau | G01V 5/101 |
| | | | 250/269.6 |
| 9,261,468 B2 | 2/2016 | Bingham et al. | |
| 9,599,729 B2 | 3/2017 | Roscoe et al. | |
| 9,632,188 B2 * | 4/2017 | Chandrasekharan | G01V 5/281 |
| 10,162,065 B2 * | 12/2018 | Stassun | G01T 1/36 |
| 11,226,428 B2 * | 1/2022 | Radel | G21G 4/02 |
| 11,397,277 B2 * | 7/2022 | Chin | G01N 23/22 |
| 12,025,767 B2 * | 7/2024 | Grau | G01V 5/234 |
| 12,044,636 B1 * | 7/2024 | Salvino | G01V 5/02 |
| 12,100,580 B1 * | 9/2024 | Salvino | H01J 49/0086 |
| 2013/0034198 A1 | 2/2013 | Chandrasekharan et al. | |
| 2023/0411134 A1 | 9/2023 | Ryan et al. | |

* cited by examiner

EXTRATERRESTRIAL NANOSECOND NEUTRON ANALYSIS AND ASSOCIATED PARTICLE IMAGING

CROSS-REFERENCE TO RELATED APPLICATIONS

This continuation-in-part application claims priority to and the benefit of U.S. Pat. No. 12,100,580 issued on Sep. 24, 2024 entitled: LOCATING MINING SITES USING AN OPEN MASS SPECTROMETER, filed on Jan. 8, 2024, the entire disclosure of which is hereby incorporated by reference, which is a continuation-in-part application claiming priority to and the benefit of U.S. Pat. No. 12,044,636, issued on Jul. 23, 2024 entitled: LOCATING MINING SITES USING NEUTRON DETECTION, filed on Dec. 13, 2023, the entire disclosure of which is hereby incorporated by reference.

BACKGROUND OF THE INVENTION

Field of the Invention

The present invention relates generally to identifying mining sites using helium-3 detection techniques to map areas of high concentrations of He-3 to be mined.

Description of Related Art

Identifying the concentration of target materials, such as helium-3 (He-3), that are intended to be mined before diving into mining operations holds immense value. Having a general idea of target element concentration within a mining site enables a more efficient strategy of extraction methods effectively, minimizing unnecessary loss of time and expense. By conducting, at least, a cursory assessments of target material concentration, mining ventures can employ better targeted and efficient extraction techniques, reducing the need for extensive excavation and processing. This approach not only conserves precious resources used to mine the target materials but also mitigates the disruption to the general mining location.

Moreover, knowing the target material concentration beforehand significantly influences the economic viability of a mining project. Accurate assessments allow for informed decisions about whether to proceed with extraction, avoiding costly endeavors where the target material concentration might be too low to yield minimum returns. By identifying regions of high target material concentration, mining operations can more efficiently use their resource allocation, directing investments toward sites with higher concentrations, thereby maximizing the efficiency and profitability of their operations while minimizing lost time and unnecessary mining costs. Ultimately, the value of identifying target materials concentrations prior to mining lies in its ability to ensure a more efficient approach to target material extraction.

It is to innovations related to this subject matter that the embodiments of the invention are generally directed.

SUMMARY OF THE INVENTION

The present invention generally relates to an apparatus for identifying He-3 as well as other target materials from extra-terrestrial bodies in a very low-pressure environment.

In that light, certain embodiments of the present invention envision a nanosecond neutron analysis and associated particle imaging device (NNA/API) with a gamma ray detector system arrangement (arrangement) for detecting ilmenite, the arrangement comprising a transport that carries an NNA/API and at least one gamma ray detector, and a cosmic radiation shield. The transport is defined by a top end and a bottom end, wherein the bottom end is configured to interface a surface of an extra-terrestrial body. The transport is configured to be moved in different locations on the surface of the extra-terrestrial body. The NNA/API comprises a neutron emitter configured to aim a cone of neutrons towards the surface of the extra-terrestrial body from the bottom end. The NNA/API is devoid of a vacuum chamber adapted that would otherwise maintain a pressure that is lower than an ambient environment to the arrangement. The at least one gamma ray detector along with the signal processing electronics comprise a gamma ray detection system. The gamma ray detection system can further include an onboard computer allowing for active identification of characteristic gamma rays, including those from titanium and/or iron and in some cases identify a ratio of these elements which is consistent with the presence of ilmenite. The arrangement further comprises a cosmic radiation shield that covers the NNA/API and the at least one gamma ray detector, wherein the cosmic radiation shield is configured to at least shield a portion of cosmic radiation that comprises cosmic gamma radiation and cosmic neutron radiation. The cosmic radiation shield is disposed at the top end of the transport. The arrangement further comprises an energy source that is configured to provide energy to the NNA/API and the at least one gamma ray detection system. The arrangement also comprises non-transient memory that is connected to the gamma ray detection system, wherein the non-transient memory is configured to retain the gamma ray energy and/or elemental concentration information. A transmitter in the arrangement is configured to transmit this information to a remote receiver.

In another aspect of the present invention, some embodiments envision an ilmenite detector arrangement that uses associated particle imaging, the ilmenite detector arrangement comprising a rover, an NNA/API and a gamma ray detector. The NNA/API comprises a neutron emitter that is configured to aim a cone of neutrons towards a surface of an extra-terrestrial body from the rover. The NNA/API is devoid of a vacuum chamber. The gamma ray detector is configured to detect concentrations of titanium and iron, wherein the titanium and the iron concentrations are from within 12 inches of the surface of the extra-terrestrial body. The gamma ray detector is configured to detect the titanium concentrations via gamma radiation emitted from the surface due to neutrons impinging the surface from the cone of neutrons. The ilmenite detector arrangement further comprises a cosmic radiation shield, a computing processor and a transmitter. The cosmic radiation shield covers the NNA/API and the gamma ray detector from at least a portion of both gamma and neutron cosmic radiation. The computing processor is configured and arranged to determine if the concentrations of titanium and iron comprises a ratio that is consistent with ilmenite. The transmitter is configured and arranged to transmit the concentration information to a remote receiver. The rover is configured to carry the ilmenite detector arrangement to different locations on the surface.

Another embodiment of the present invention contemplates a method comprising moving a rover from a first location to a second location on the Moon; emitting a neutron beam of a plurality of neutrons at a surface in the first location; detecting gamma rays from decaying unstable titanium atoms and iron atoms bombarded with the neutrons from the neutron beam; determining a ratio of the titanium atoms to the iron atoms from gamma rays; and establishing that the ratio corresponds to ilmenite.

Certain other embodiments of the present invention envision a mass spectrometer arrangement that comprises a mass spectrometer carried around on a mobile carrier. The mass spectrometer comprises a base-particle pathway defined as beginning from an intake port and ending at a detector plate (the base-particle pathway traverses through the mass spectrometer). The mass spectrometer further comprises an intake funnel having a funnel shaped housing that extends from the intake port to an exit port, wherein the exit port is smaller than the intake port. The intake port is unobstructed from directly interfacing an open environment and is configured to be in communication with the open environment during operation. The mass spectrometer further comprises an ionizer adjacent to the exit port, wherein the mass spectrometer ionizer is configured to ionize base-particles (such as atoms or single molecules) in a portion of the base-particle pathway. The mass spectrometer further comprises a detector housing that comprises the detector plate and an angled housing having split-pole magnets that are configured to direct the base-particles at an angle β+/−an offset (depending on the mass of the base-particle), such as less than 10 degrees, along the base-particle pathway. The mass spectrometer arrangement, and in some embodiments, the intake funnel, has a granular surface disrupter configured to liberate the base-particles from a granular surface that is external to the mass spectrometer arrangement. The mass spectrometer arrangement further has a mobile carrier that supports or otherwise holds the mass spectrometer. The mobile carrier is configured to position the intake port over the exterior granular surface.

Another embodiment of the present invention envisions a mass spectrometer system comprising a mass spectrometer, a heating element, and a mobile carrier. The mass spectrometer can comprise a channel that extends through the mass spectrometer system from an intake port to a detector. The mass spectrometer can further comprise an intake funnel comprising an intake port that is configured to receive base-particles directly from an open environment. The intake funnel is configured to direct the base particles to an exit port. The mass spectrometer can further comprise an ionizer that is configured to ionize the base-particles from the exit port. The mass spectrometer also comprises split-pole magnets disposed in an angled housing that is between the ionizer and the detector. A heating element, which can be in the mass spectrometer or elsewhere in the system, is configured to liberate the base-particles via heat from a granular surface that is external to the mass spectrometer system. The system envisions a mobile carrier that is configured to position the intake port in close proximity to the exterior granular surface.

A mass spectrometer arrangement is envisioned to comprise a mass spectrometer being positioned and supported by a mobile carrier. The mass spectrometer can have an intake funnel that is configured to receive base-particles through an intake port directly from an open environment. The intake funnel is configured to direct the base particle into the mass spectrometer. The arrangement can further comprise a heating element configured to liberate the base-particles from regolith via heat, the regolith is not part of the open environmental mass spectrometer arrangement. Some embodiments envision the mass spectrometer comprising the heating element. The arrangement further comprises a mobile carrier that is configured to position the intake port over the regolith (positioned within 12 inches of the surface of the regolith).

Certain other embodiments of the present invention envision a He-3 detection arrangement as shown in comprising a thermal neutron source and a thermal neutron detector. More specifically, the thermal neutron source can comprise a thermal neutron emitter encapsulated in a hydrogen rich material, wherein the thermal neutron source is configured to emit thermal neutrons in all directions. The thermal neutron detector can be configured to detect a concentration of the thermal neutrons. In the arrangement, a neutron shield is interposed between the thermal neutron source and the thermal neutron detector. The neutron shield is configured to block some of the thermal neutrons emitted from the thermal neutron source that are aimed at the thermal neutron detector (such as attenuating at least 90% of the neutrons that are between the shield and the thermal neutron detector). A power source, such as a battery or solar system, for example, is configured to provide power to the thermal neutron source and the thermal neutron detector. A metal plate has a periphery, which is the sidewall boundary of the metal plate shown by the four side. The thermal neutron source, the thermal neutron detector, and the neutron shield are disposed on the metal plate within the periphery.

Optionally, another embodiment of the present invention envisions a He-3 detection system comprising generally comprising a thermal neutron detector sensing a quantity of neutrons emitted from a thermal neutron source to evaluate a concentration of He-3 in regolith or some other granular soil. More specifically, the embodiment envisions the thermal neutron source configured to emit thermal neutrons in all directions wherein the thermal neutron detection system is configured to detect a neutron concentration of the thermal neutrons backscattered from granular soil. A neutron shield is interposed between the thermal neutron source and the thermal neutron detector to isolate the neutrons detected from the regolith thereby assessing a quantity or concentration of He-3 in the regolith. A power source, such as a battery, can be included with the system to provide power to the thermal neutron source and the thermal neutron detection system. The neutron shield, the thermal neutron source, and the thermal neutron detection system are envisioned to be disposed on a metal plate that is configured to be placed within 10 cm of a surface of the granular soil.

Yet another optional embodiment of the present invention envisions an arrangement that detects He-3 in regolith on the Moon. The arrangement can comprise a neutron source that is configured to emit thermal neutrons, a neutron detector that is configured to detect a neutron concentration of the neutrons that are backscattered from the regolith and a neutron shield that is interposed between the neutron source and the neutron detector. The neutron shield is configured to block at least some of the neutrons in a line-of-sight between the neutron source and the neutron detector. The arrangement can also include a power source that is configured to provide power to the thermal neutron source, the thermal neutron detection system, and a transmitter. The transmitter is configured to transmit the neutron concentration/s to a remote receive. The neutron shield, the thermal neutron source, and the thermal neutron detection system are envisioned to be disposed on a metal plate. The arrangement is further envisioned to be moved to different locations on the surface of the Moon via a transporter.

DETAILED DESCRIPTION

Figure 1A:
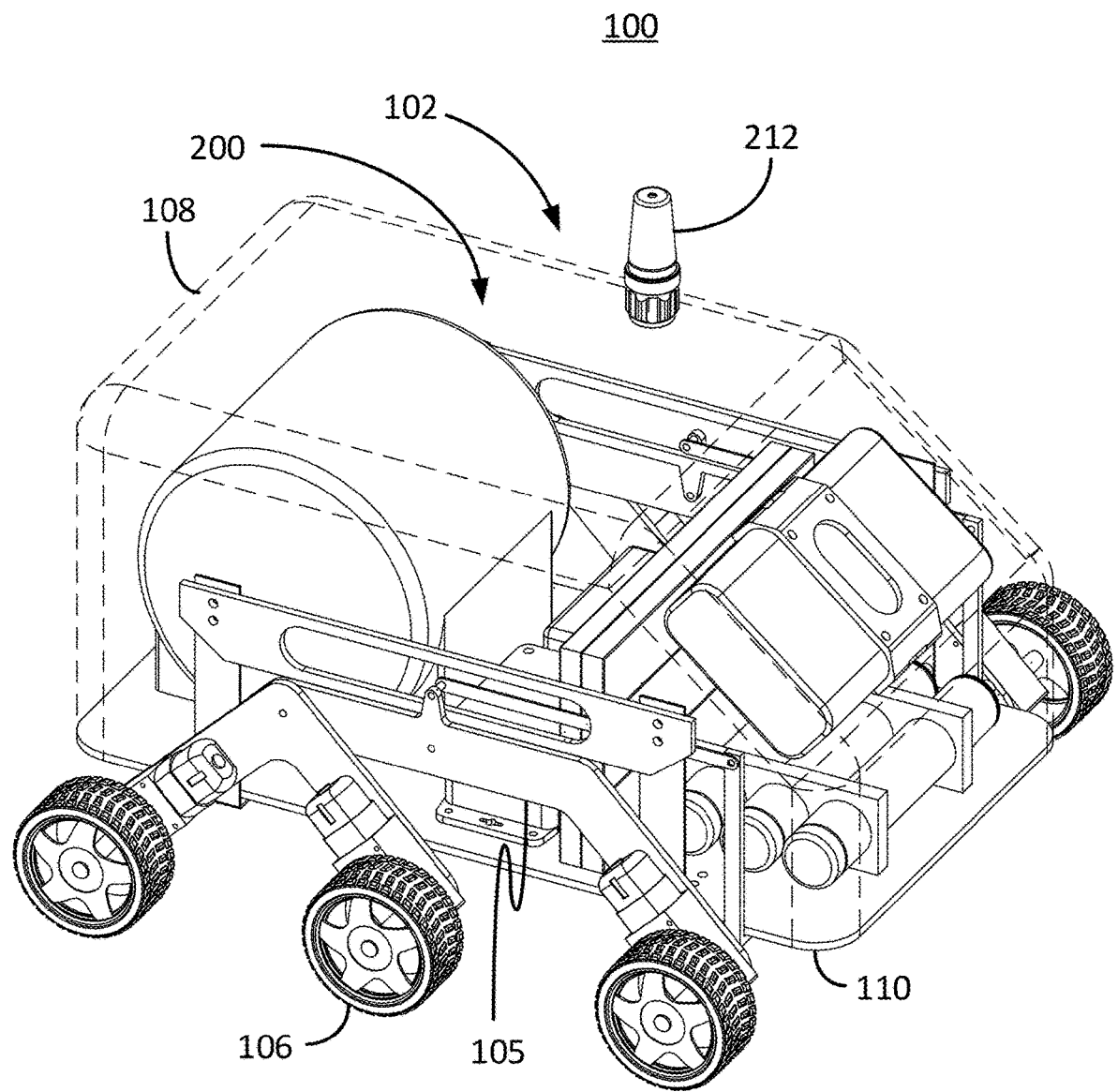
FIG. 1A is a line drawing of a transport and He-3 detector embodiment consistent with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific +/−value assigned to "essentially", then assume essentially means to be within +/−2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112(f). In what follows, similar or identical structures may be identified using identical callouts.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Described herein are embodiments directed to identification of target materials in an extremely low-pressure and low gravity environment. Extremely or very low-pressure environment is defined herein as below 7 millibars, wherein pressure at sea-level on Earth is approximately 1 bar. Low gravity is defined herein as at most 4 m/sec$^2$. Aspects of the present invention consider mining gaseous atoms and molecules on extraterrestrial bodies, such as the Moon, asteroids, moons orbiting other planets, Mars, etc. Many of these extraterrestrial bodies have little to no ambient pressure at or within several meters of their surfaces and depending on the size of the extraterrestrial body, they generally have a significantly lower gravitational pull than that experienced on Earth.

Though embodiments of the present invention can be used in conjunction with many different extraterrestrial bodies, it is one object of the present invention to focus on mining gaseous atoms and molecules (materials) from the Moon, with special focus on helium-3 (He-3). The Moon's atmosphere (the surface boundary exosphere) has a pressure of about $3\times10^{-15}$ bars and can range in temperature between 20° to 400° Kelvin. In the interest of continued exploration of the Moon as well as maintaining long-term residents on the Moon, extracting or otherwise mining important target materials including gaseous materials from the Moon, such as oxygen, nitrogen, hydrogen, and helium, for example, reduces the dependency of transporting such gaseous materials from the Earth. Moreover, He-3, a light stable isotope of helium having two protons and one neutron, which has promise as an important constituent in fusion reactions, is far more abundant on the Moon than on Earth. In some estimates, He-3 is more than a thousand times more abundant on the Moon than compared to the Earth making the Moon a better target to obtain He-3.

Certain embodiments of the present invention envision identifying target material concentrations on the surface or within several feet of the surface of the Moon by way of detecting backscattered neutron concentrations from moon regolith, or simply "regolith". Optional embodiments use an open environment mass spectrometer to sample concentrations of He-3 from moon regolith. In this way, target material (such as He-3) to be mined can be mapped in mining regions of interest to more efficiently mine the riches areas of the target material.

Accordingly, some embodiments of the present invention contemplate a He-3 detector arrangement that generally comprises a neutron shield that is interposed between a thermal neutron source and three thermal neutron detectors all resting on a metal platform. In operation, thermal neutrons from the thermal neutron source are emitted when the He-3 detector arrangement is either sitting directly on the ground (regolith) or just above it. Some of the thermal neutrons from the neutron source will backscatter from the regolith where they will be detected by the thermal neutron detection system and a baseline count level will be registered. When He-3 is present in the regolith, some of the thermal neutrons will be absorbed by the He-3 reducing the detected count rate. When integrated into a rover, the arrangement can be either moved from place to place with count rates at each location compared, or the rover might creep slowly along the surface. In this manner, higher and lower levels of He-3 in the regolith can be mapped.

Other embodiments of the present invention contemplate a He-3 detector arrangement that generally comprises a mass spectrometer that has an intake funnel configured to receive (sniff out) He-3 through an intake port directly from an open environment. The intake funnel is configured to direct the He-3 into the mass spectrometer. The arrangement further comprises a heating element configured to liberate the He-3 from regolith via heat. A mobile carrier is configured to position the intake port the regolith to obtain samples of the He-3.

Still other embodiments of the present invention contemplate a He-3 detector arrangement that generally comprises a gamma ray detector that is coupled with nanosecond neutron analysis and associated particle imaging system (NNA/API) that identifies elements and minerals closely associated with He-3, such as ilmenite, which traps He-3. A mobile carrier is configured to position the NNA/API and gamma ray detector/s over the regolith on the Moon to detect elements that associate with He-3. Concentration data of the elements detected that associate with He-3 can be processed via a computer to map out high He-3 concentration regions on the Moon for streamlining He-3 mining.

The different embodiments to either detect He-3 directly or through association comprise many elements and methods that are interchangeable, such as a mobile carrier, electronics, power arrangements, communications, etc. Accordingly, concepts introduced and described for various embodiments in the different figures may be combinable in an obvious manner to round out embodiment options not necessarily presented in any given figure.

Referring to the drawings, FIG. 1A is a line drawing of a transport and He-3 detector embodiment consistent with embodiments of the present invention. The transport and He-3 detector embodiment 100 generally comprises a He-3 detector 200 that is depicted as being supported or otherwise carried by a rover 102. The rover 102 comprises an ambulatory arrangement, which in this embodiment are wheels 106 that are mounted on a suspension system 105 but could just as easily be comprised of tracks, robotic legs, or some other kind of ambulation arrangement to carry the He-3 detector 200 to different sites on the surface 112A of the Moon 122. As shown, the He-3 detector 200 is resting atop a metal plate 110 and is essentially encapsulated by a cover 108. An antenna 212, which extends from cover 108, is connected to transmitter electronics and possibly a transceiver (not shown) housed in a transmitter 214. The antenna 212 facilitates at least one way communication, such as by RF, with a receiver that is located away from the rover 102. Other embodiments envision the He-3 detector 200 being integrated with a low gravity skipper 120, like that shown in FIG. 1B, wherein the low gravity skipper 120 jumps off the surface 112A of the Moon 122 and then back down on the surface 112A of the Moon 122 in a different location. The low gravity skipper 120 can use jet propulsion or a spring-loaded platform to skip off the surface 112A of the Moon 122. The spring-loaded platform avoids disrupting the surface 112A of the regolith 112.

Figure 1B:
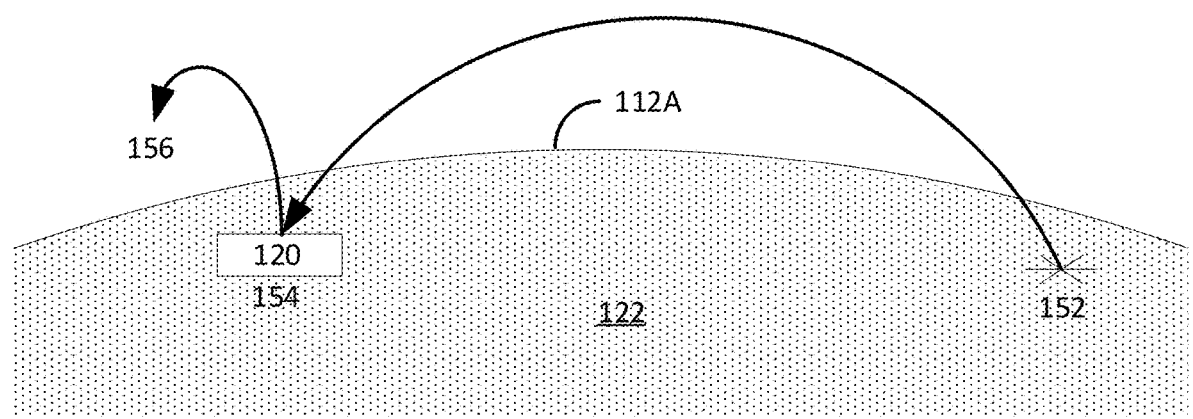
FIG. 1B is a schematic diagram of mapping a region on the Moon with the He-3 detector arrangement onboard a skipper transporter consistent with embodiments of the present invention.

FIG. 1B is a schematic diagram of mapping a region on the Moon 122 with the He-3 detector arrangement onboard a skipper transporter consistent with embodiments of the present invention. This embodiment contemplates a skipper 120 that is operable to launch from a first site 152, after evaluating the concentration of He-3 at the first site 152, land at a second site 154 and evaluate the concentration of He-3 at the second site 154 before launching to a third site 156 to evaluate the concentration of He-3 at the third site 156. In this way, a portion of the lunar surface 112A can be mapped out for He-3 concentrations to target the richest and most ideal locations to mine He-3. Because the gravity on the Moon 122 is about ⅙ the Earth's gravity, the energy required to launch (and land) the skipper 150 is significantly less. The skipper 120 can be a spring-loaded vehicle or pod and can be held level (maintain an upright orientation while skipping) with a gyroscope or jet packs. Optionally, the skipper 120 can be equipped with rockets to skip from location 154 to location 156.

Figure 2A:
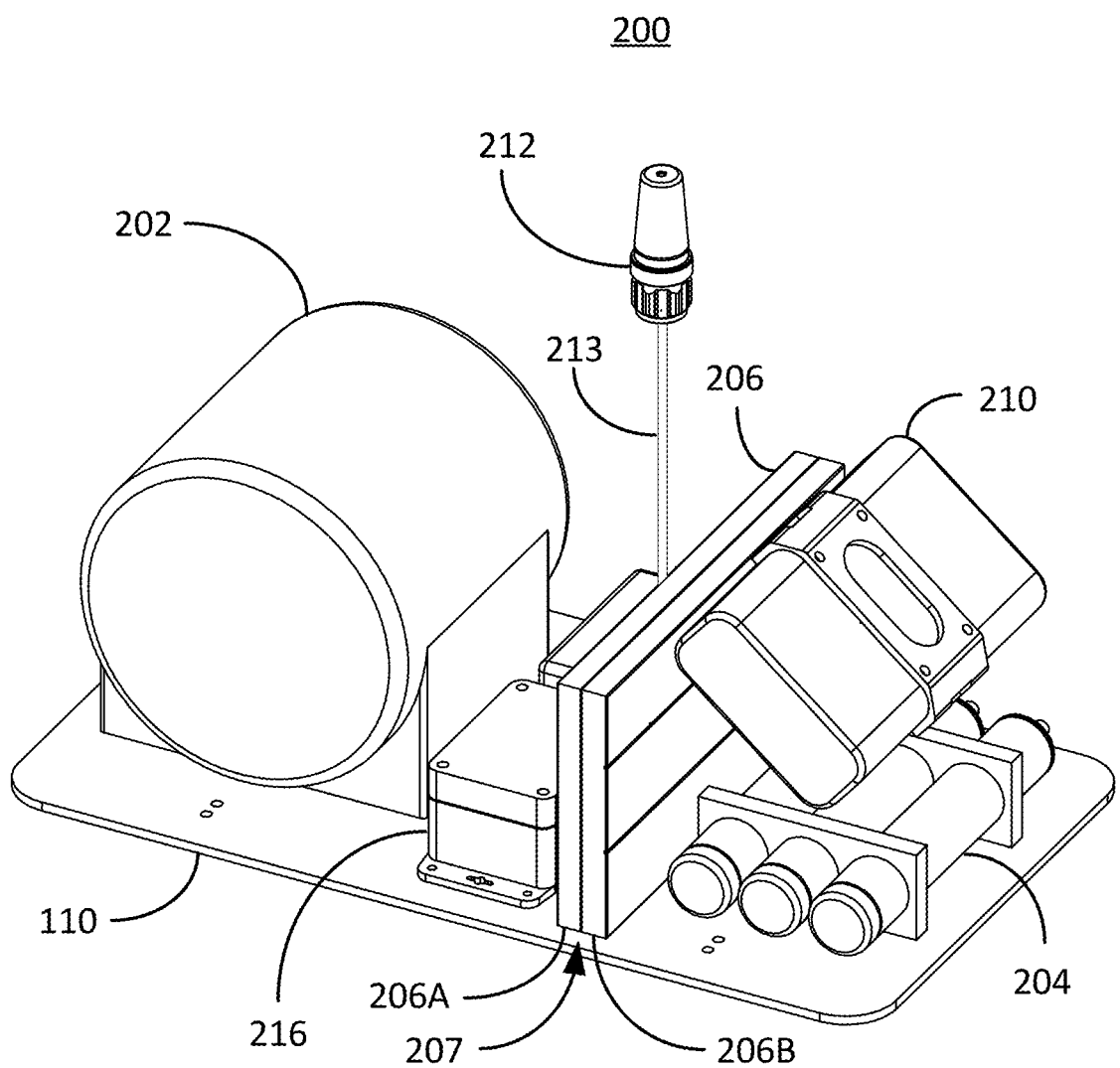
FIGS. 2A-2C are line drawings depicting the He-3 detector arrangement consistent with embodiments of the present invention.
Figure 2B:
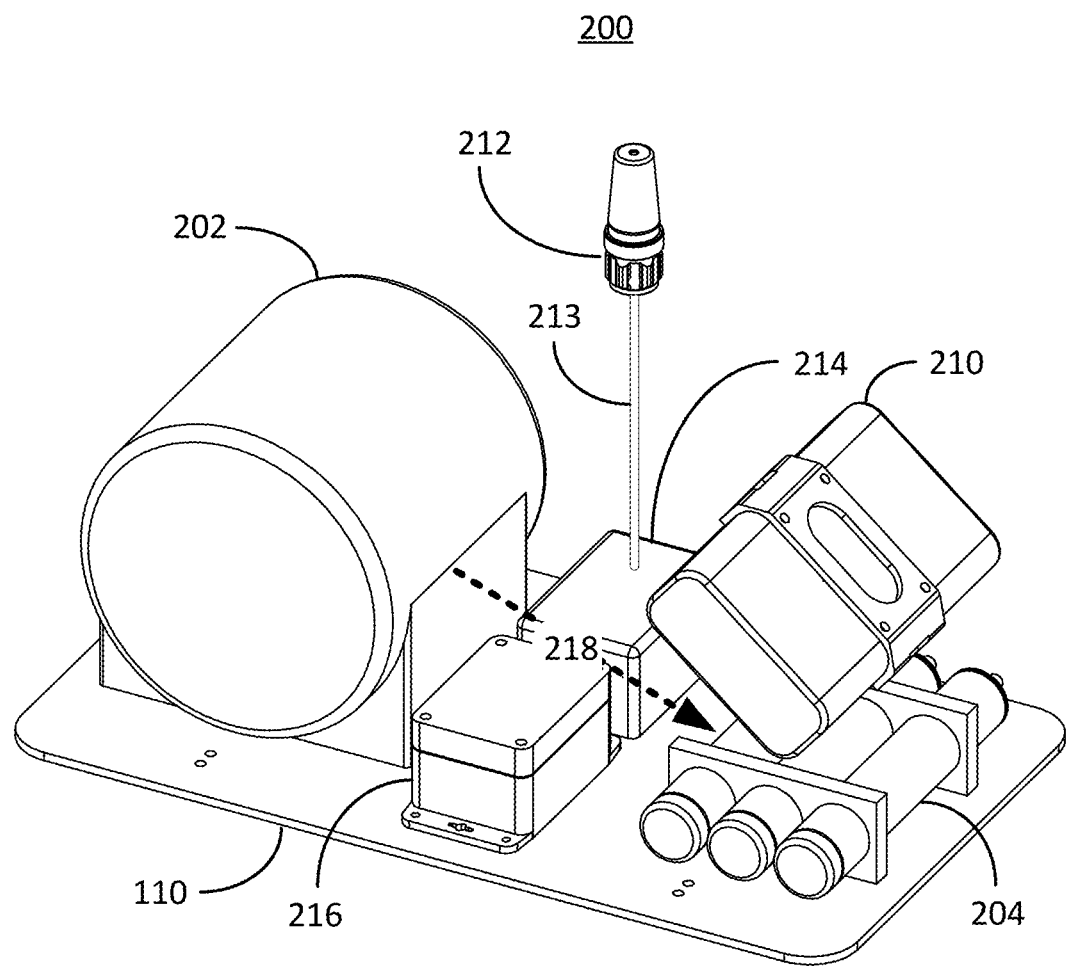
Figure 2C:
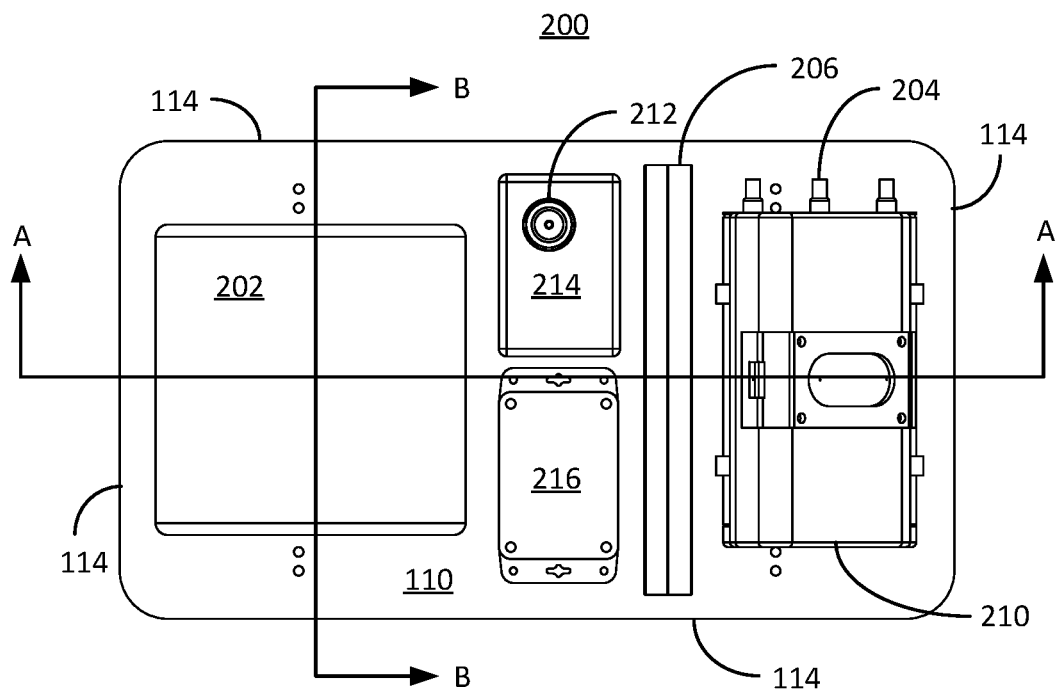

FIGS. 2A-2C are line drawings depicting the He-3 detector arrangement 200 (which is interchangeable with simply 'He-3 detector 200' or 'arrangement 200') consistent with embodiments of the present invention. As shown in FIG. 2A, is an isometric line drawing of the primary components of the He-3 detector 200 include a neutron shield 206 that is interposed between a thermal neutron source 202 and three thermal neutron detectors 204. The neutron shield 206 blocks the line-of-sight 218 of a percentage of thermal neutrons 222 that are emitted from the thermal neutron source 202 from impacting the thermal neutron detectors 204. The line-of-sight 218 is defined as a straight line along which an observer, in this case the thermal neutron source 202 has an unobstructed view of the thermal neutron detector arrangement 204. In one embodiment, the neutron shield 206 is envisioned to be two 1-2 inch thick borated HDPE (High density polyethylene) that is produced by EMCO Industrial Plastics, LLC, headquartered in Cedar Grove, NJ. The borated HDPE is specially designed for nuclear shielding applications. The material employs 5% Boron by weight to shield neutrons 222 in a variety of applications including high intensity X-rays, cancer treatment facilities, hospitals, nuclear submarines and nuclear power plants. A 1-inch-thick plate will attenuate the thermal neutrons 222 to about 5% in the line-of-sight 218 on the other side of the neutron shield 206, and two 1-inch-thick plate will attenuate the flux to about 0.025% of the thermal neutrons 222 in the line-of-sight 218 on the other side of the neutron shield 206. In other words, two plate should attenuate or otherwise block 99.25% of the neutrons 222 from reaching the thermal neutron detectors 204. In the present embodiment, the two plates 206A and 206B are separated by a lead sheet 207. As further shown, the neutron shield 206, the thermal neutron source 202, the thermal neutron detectors 204, the battery pack 210, the antenna 212 and antenna connection line 213 are all supported by the metal plate 110.

FIG. 2B is a line drawing that illustratively depicts the He-3 detector arrangement 200 of FIG. 2A but without the neutron shield 206 to show the line-of-sight 218 between the thermal neutron source 202 and thermal neutron detector apparatus 204. The line-of-sight 218 is the direct path between the thermal neutron source 202 and three thermal neutron detectors 204, which essentially comprise the thermal neutron detector apparatus 204.

The thermal neutron detector apparatus 204 is sensitive to the amount of neutrons 222 that impact the detector apparatus 204 and therefore is capable of providing information about the neutron concentrations it encounters. There are several commercially available thermal neutron detectors 204 including BF3 Counter Tubes from Mirion Technologies headquartered in Atlanta, Georgia. This thermal neutron detector 204 uses boron trifluoride (BF3) neutron counters. The neutron sensitivity of these proportional counters is achieved by filling the tube with the gas boron-tri-fluoride, made of highly enriched Boron-10. Thermal neutrons 222 react with the isotope Boron-10 emitting alpha particles, which produce ionization in the gas filling of the detector (electrons and gas ions). In the electrical field between the electrodes these charged particles will be accelerated and secondary ionization happens. This so called "gas amplification" multiplies proportionally the amount of charge generated in the tube.

FIG. 2C is a top view line drawing of the He-3 detector arrangement 200 depicting the elements with respect to the cut-lines A-A and B-B. For reference, the computer electronics enclosure 216 is shown, which contain the necessary computing and electronics to run the various electrical elements comprised by the He-3 detector 200 and the transmitter 214 that houses the communications transmitter or more likely a transceiver. The antenna 212 is linked to the communications circuitry in the transmitter 214. Also shown are the battery 210, thermal neutron source 202, the shield and the thermal neutron detector apparatus 204. The thermal neutron detector apparatus 204 comprises three detectors in this embodiment but can have as few as one detector or as many as desired. Cut-line A-A essentially bisects the metal plate 110 and the thermal neutron source 202, the shield and the thermal neutron detector apparatus 204. Cut-line B-B, which is orthogonal to cut-line A-A, bisects the thermal neutron source 202.

Figure 2D:
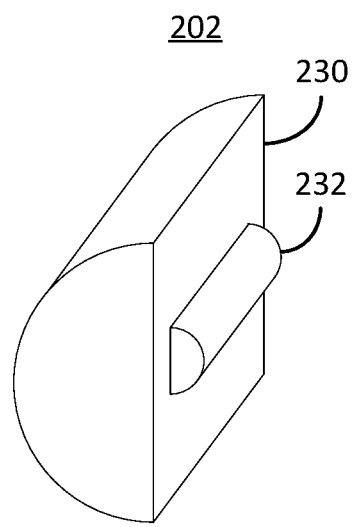
FIG. 2D is a block diagram depicting the thermal neutron source embodiment along cut-line B-B consistent with embodiments of the present invention.

FIG. 2D is a block diagram depicting the thermal neutron source embodiment 202 along cut-line B-B consistent with embodiments of the present invention. This embodiment of the thermal neutron source 202 can include an Americium Beryllium (AmBe) neutron source (core) 232 encapsulated within a hydrogen rich shell 230, which in this embodiment is envisioned to be a polyethylene shell. The polyethylene shell 230 thermalizes the neutrons 222 by reducing their energy through collisions with the hydrogen nuclei in the polyethylene. AmBe thermal neutron sources are commercially available by QSA Global, Inc., headquartered in Burlington, MA. An alternative thermal neutron source 202 comprises an integrated moderator neutron generator, such as deuterium-tritium or deuterium-deuterium neutron generators, for example, which are commercially available from Adelphi Technology, Inc., headquartered in Redwood City, CA. Accordingly, certain embodiments of the present invention envision the thermal neutron source 202 being an off-the-shelf thermal neutron source readily commercially available.

Figure 2E:
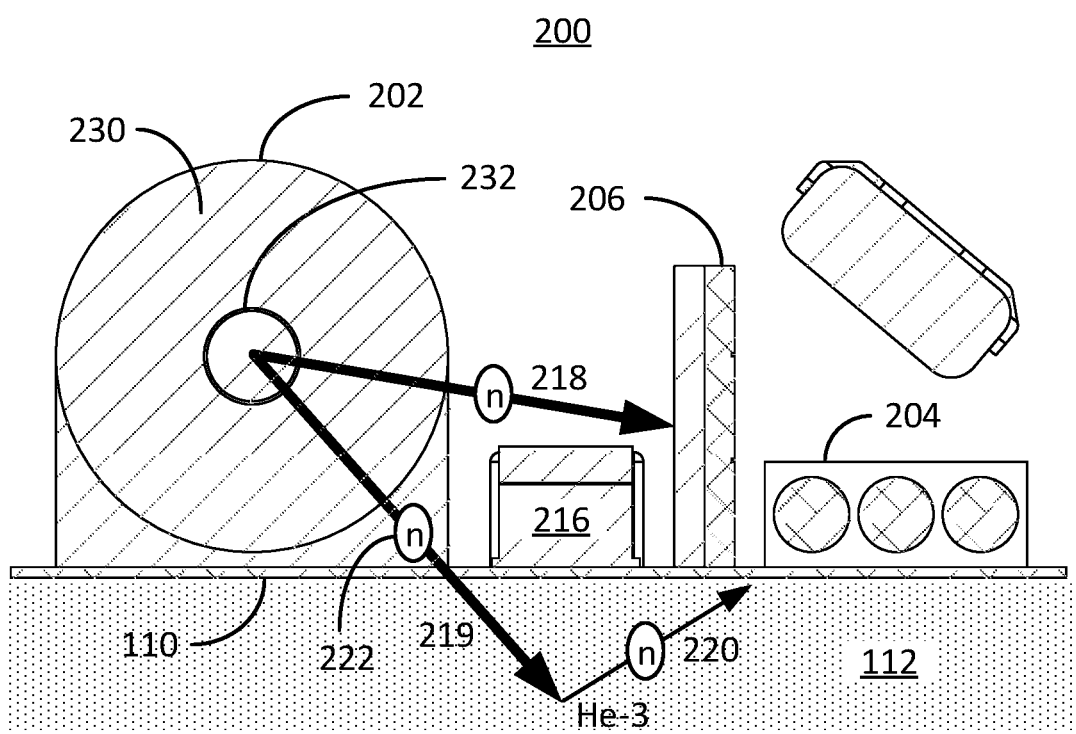
FIG. 2E is a line drawing of a cross-section of the He-3 detector arrangement along cut-line A-A consistent with embodiments of the present invention.

FIG. 2E is a line drawing of a cross-section of the He-3 detector arrangement 200 along cut-line A-A consistent with embodiments of the present invention. He-3 is known to absorb neutrons 222. Hence, the concentration of neutrons 222 passing through He-3 will consequently be reduced. In the present arrangement 200, some of the neutrons 222 emitted from the thermal neutron source 202, as shown in arrow 219, will backscatter from the regolith 112 to the thermal neutron detector 204 (see narrow arrow 220) with some of the neutrons 222 in arrow 219 being absorbed by He-3 present in the regolith 112. Accordingly, the concentration of He-3 in the regolith 112 will be inversely proportional to the concentration of neutrons 222 detected by the thermal neutron detector 204 relative to those neutrons 222 emitted by the thermal neutron source 202. In other words, the higher the concentration of He-3 present in the regolith 112, the lower the number of neutrons 222 will reach the thermal neutron detector 204, which is represented by the narrower arrow 220. The neutrons 222 in the line-of-sight 218 of the neutron detector 204 are blocked by the neutron shield 206 from hitting the neutron detector 204 to improve the resolution of the backscattered neutron concentration 220. The metal plate 110, which in some embodiments is aluminum, does not change the number of neutrons 222 that penetrate into the regolith 112 (as emitted by the thermal neutron source 202). In accordance with this arrangement 200, the concentration of neutrons 222 detected by the thermal neutron detector 204 are compared with the concentration of neutrons 222 produced by the thermal neutron source 202 to provide an indication of He-3 concentration in a region of regolith 112. Though an accurate amount of He-3 may not be obtainable, a relative amount is, which is sufficient to identify and map out high interest areas on the Moon 122 for mining He-3 based on sampling different areas/regions on the Moon 122. Data acquisition and computing can be done via the electronics and computer system 216 on the He-3 detector arrangement 200.

Figure 3:
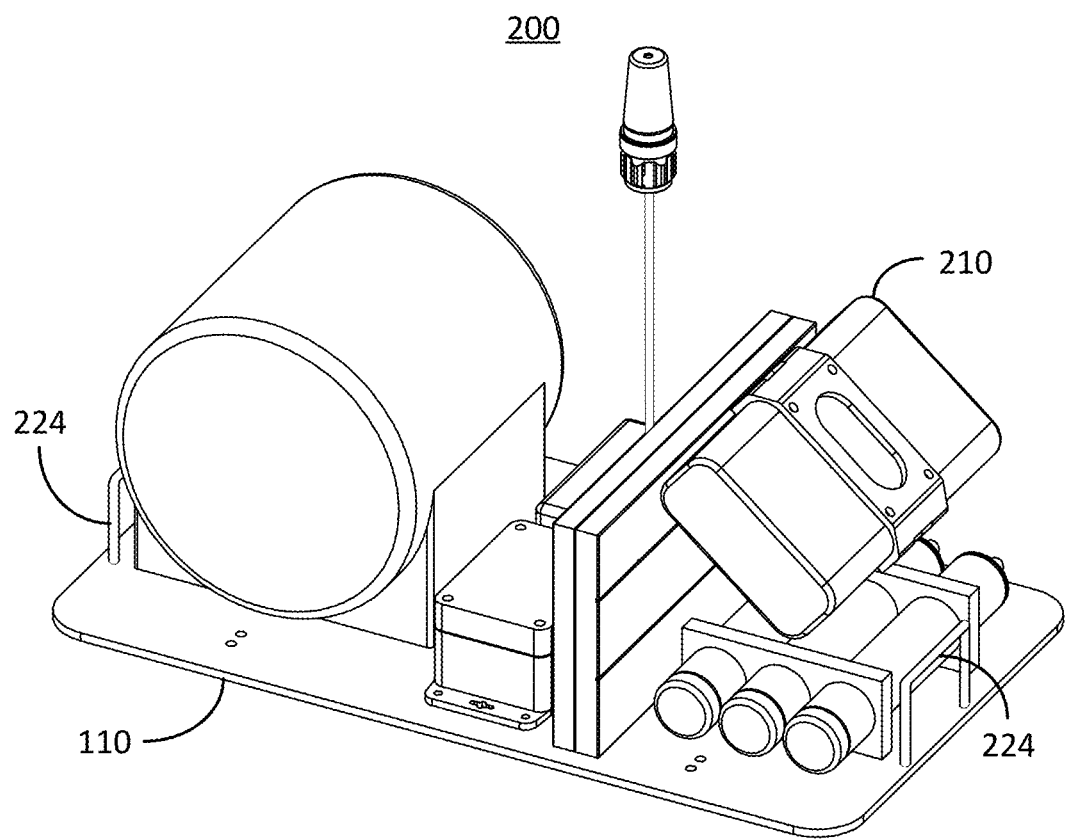
FIG. 3 is a line drawing of another embodiment of the He-3 detector arrangement comprising handles consistent with embodiments of the present invention.

FIG. 3 is a line drawing of another embodiment of the He-3 detector arrangement 200 comprising handles 224 that can be used to carry or otherwise transport the He-3 detector arrangement 200 from location to location manually or via a robot.

Figure 4A:
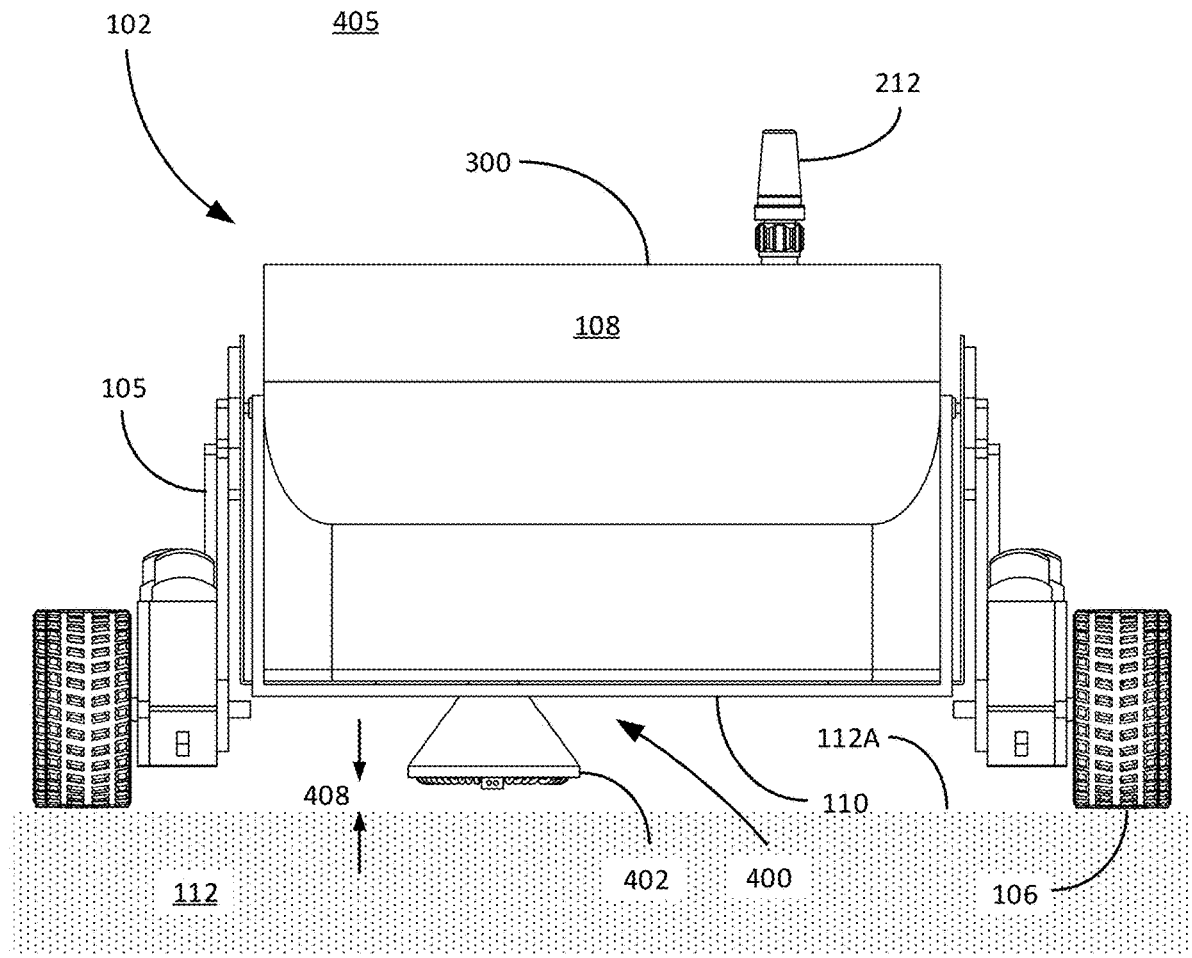
FIGS. 4A-4C depict a He-3 detector arrangement that uses an open environment mass spectrometer embodiment consistent with embodiments of the present invention.
Figure 4B:
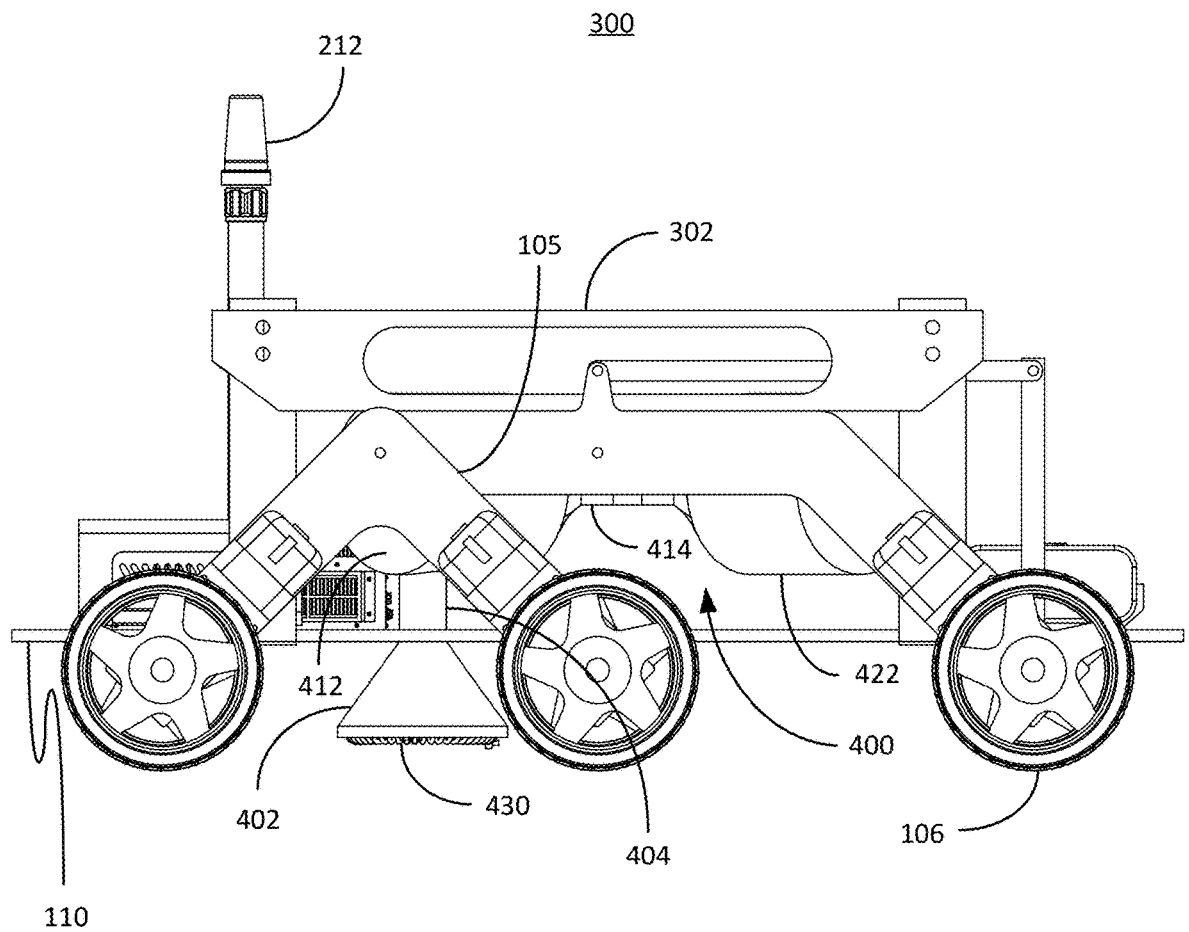
Figure 4C:
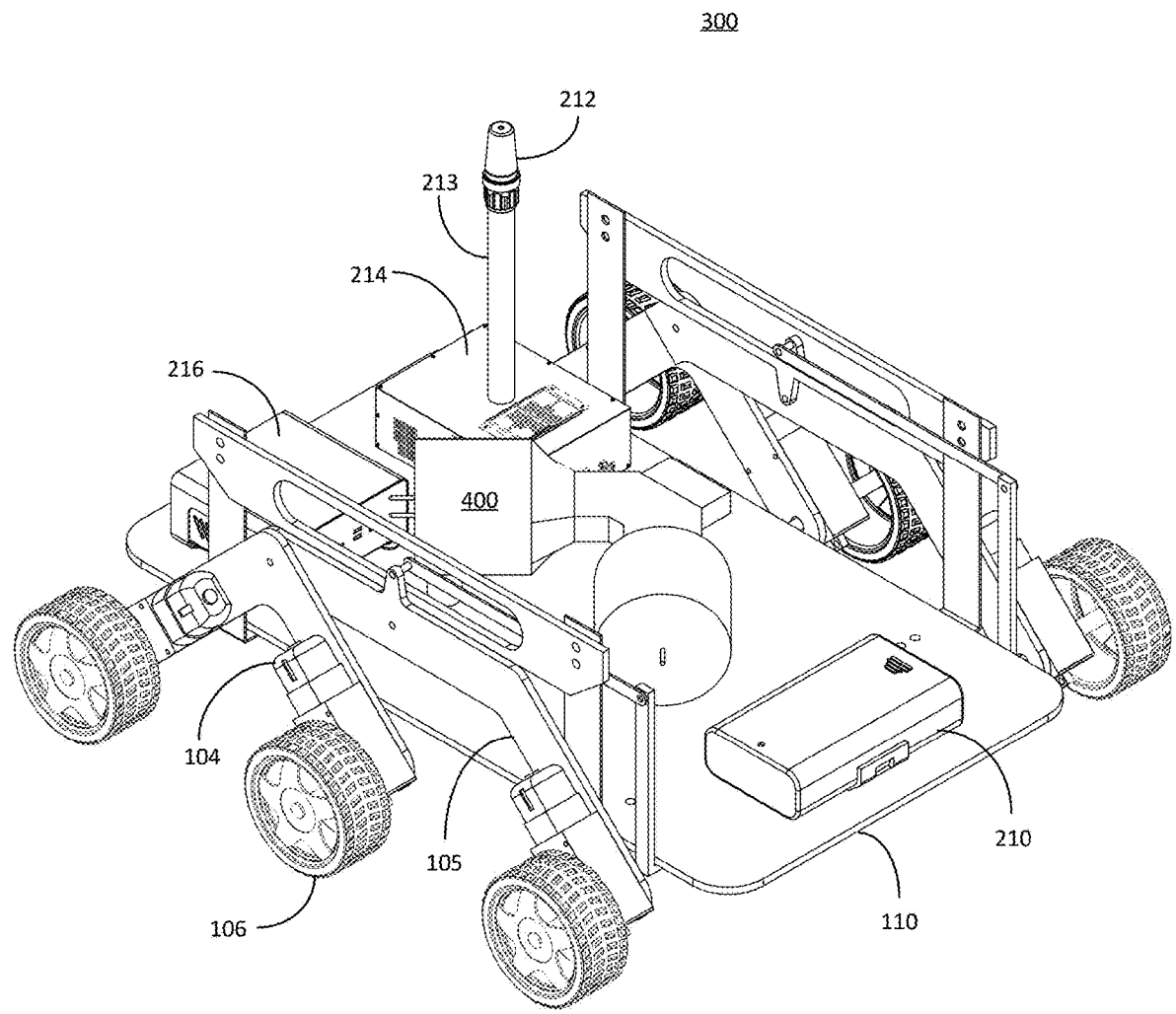

FIGS. 4A-4C depict a He-3 detector arrangement that uses an open environment mass spectrometer embodiment consistent with embodiments of the present invention. Here the mass spectrometer arrangement 300 is open to the environment 405, meaning there is no pressure chamber that surrounds the mass spectrometer 400, rather the mass spectrometer 400 functions at the ambient pressure around the mass spectrometer arrangement 300. This is made possible by the low pressure on the Moon 122. All the conventional mass spectrometers today operate in a low-pressure chamber, which necessarily accompanies or is otherwise associated with conventional mass spectrometers. FIG. 4A is a front view line drawing of a mass spectrometer arrangement 300, which generally comprises a rover 102, or some other mobile carrier, such as a dispersion pod (not shown but of which many dispersion pods can be released spreading out over a large area of the Moon 122, such as hundreds of square meters to hundreds of square kilometers, for example), a skipper 120 of FIG. 1B, or a hand-held carrier 224 of FIG. 3 all of which being capable of holding a mass spectrometer 400. As shown here, the rover 102 houses the majority of the mass spectrometer 400 in a rover cover 108 and rover base 110. The rover 102 is configured to move to different locations on the surface 112A of the Moon 122 (or some other extraterrestrial body) to take concentration samples of He-3 at each of the different locations. There is an antenna 212 connected to a transceiver (not shown) to transmit He-3 concentration data at each location to a receiver of the concentration data, such as a central hub or other targeted recipient desirous of obtaining the data. The mass spectrometer 400 intakes (or sniffs) for He-3 via an intake port 434 (of FIG. 5C) at the large end of an intake funnel 402. The intake funnel 402 (intake funnel rim 409) is in close proximity 408 to the regolith surface 112A. Close proximity 408 is defined herein to be less than 12 inches. In certain embodiments, the distance 408 between the intake funnel 402 and the regolith surface 112A is preferably less than 6 inches and can be positioned right at or in contact with the regolith surface 112A. The rover's wheels 106 and suspension 105 are called out for reference.

FIG. 4B is a side view line drawing of the mass spectrometer arrangement 300 with the rover cover 108 removed from the rover 102 to reveal the components in relation to the frame 302. The mass spectrometer 400 is shown mostly suspended above the rover base plate 110 with exception to the intake funnel 402, which extends from the base plate 110 to less than 12 inches above the regolith surface 112A. As shown in more detail in connection with FIG. 5A, the intake funnel 402 is engaged with a funnel joiner 404, which is attached to an ionizer and accelerator housing 412, an angled magnet housing 414 and a detector housing 422. The suspension 105, wheels 106 and antenna 212 are called out for reference.

FIG. 4C is an isometric line drawing of the mass spectrometer arrangement 300 with the rover cover 108 removed from the rover 102 revealing the components in relation to the frame 302. An upper view of the mass spectrometer 400 is presented along with a computer system 216 and the transmitter 214 with the antenna 212 and antenna connection line 213. In this embodiment, a battery pack 210 attached to the base plate 110 is configured to provide power to the rover 102 and the electronics connected therewith. As mentioned earlier, this could be boosted by a regenerative energy source, such as solar panels (not shown) on the rover cover 108. In this embodiment, shock absorbers 104 are linked between the suspension 105 and wheels 106 to provide a smoother/more controlled ride for the equipment carried by the rover 102.

Figure 5A:
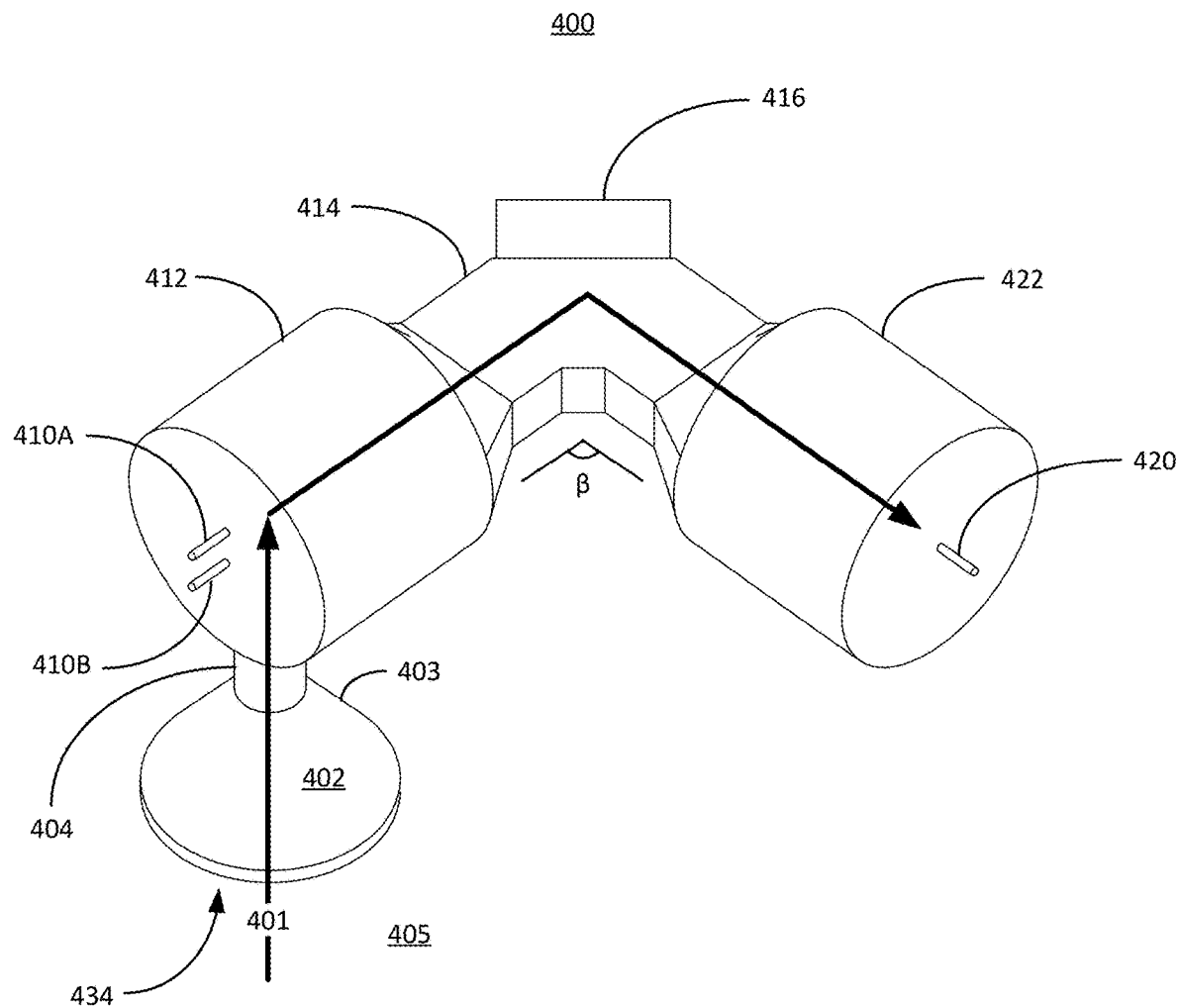
FIGS. 5A-5D are line drawings depicting different views of the mass spectrometer embodiment 400 consistent with embodiments of the present invention.

FIGS. 5A-5D are line drawings depicting different views of the mass spectrometer embodiment 400 consistent with embodiments of the present invention. FIG. 5A is an isometric view of the mass spectrometer 400 showing the base-particle pathway 401 depicted by the thick arrow. The base-particle pathway 401 is so called because it is the pathway where base-particles 460, defined by atoms and single molecules, flow through the mass spectrometer 400. The base-particle pathway 401 starts at the intake port 434 of the intake funnel 402, traversing through the funnel joiner element 404 and into the ionizer and accelerator housing 412 before it makes it to the detector 464 (of FIG. 5C) in the detector housing 422 via the angled magnet housing 414. As shown, the intake funnel 402 comprises a funnel shaped housing 403 that extends from the intake port 434 to an exit port 435 (of FIG. 6A) at the funnel joiner 404. In this embodiment, the exit port 435 is smaller than the intake port 434 (about 20% the size of the intake port 434). Certain embodiments contemplate the intake port 434 being at least twice the area of the exit port 435. In this embodiment, the angled magnet housing 414 is angled in the center at 3, which can be between 10 and 90 degrees, for example. A magnet arrangement 416 is essentially at the apex of the angled housing 414 to redirect the path of the base-particles 460, which in this case is He-3, to the detector 464. The redirected path of the base-particles 460 is 3+/−some offset depending on the mass of the base-particle 460. The offset is likely less than 10 degrees.

Figure 5B:
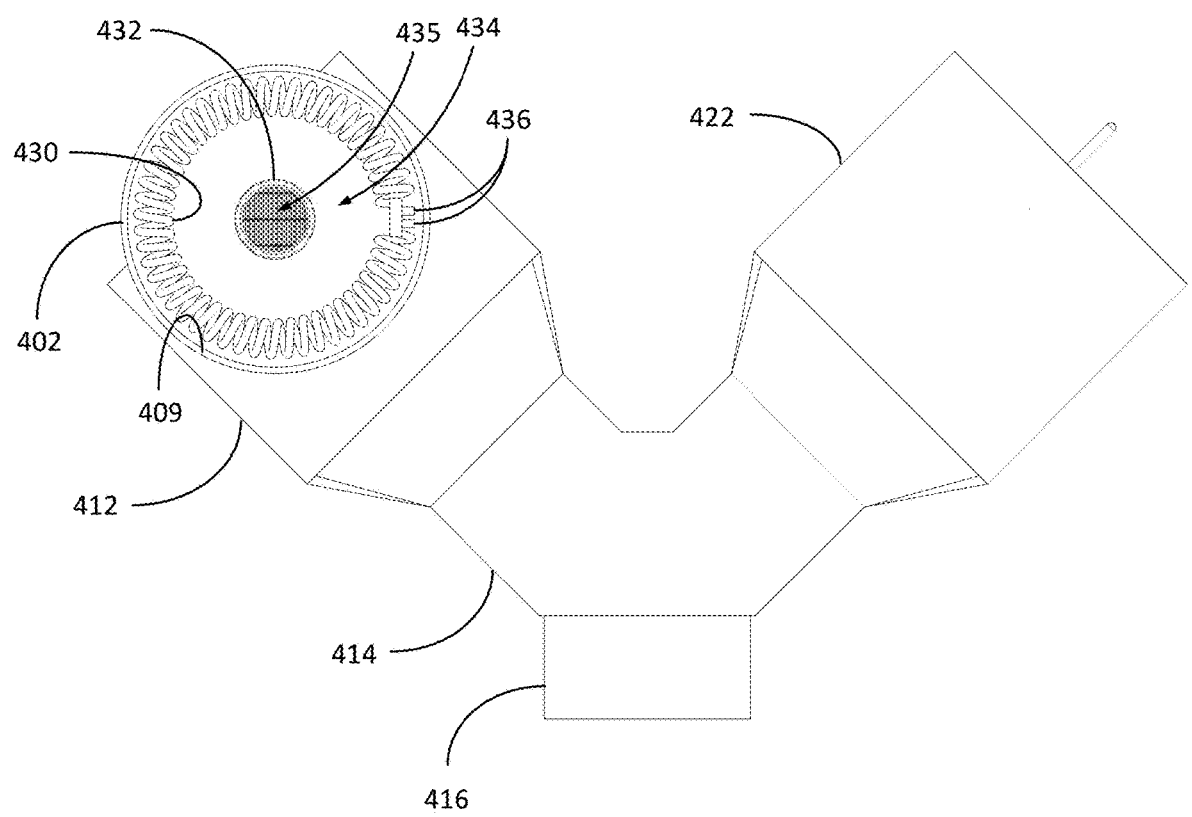

FIG. 5B is a bottom view of the mass spectrometer 400 prominently showing the funnel intake port 434. As depicted, the intake funnel 402 comprises a heating element 430, or some other granular surface disrupter, such as a laser, ultrasonic emitter, microwave emitter or some other energizer that can liberate He-3 from the granular/regolith 112. This heating element 430 is powered by the electrical leads 436. As shown here, the funnel intake port 434 is defined by the funnel intake port rim 409. Also shown is a filter 432, such as a HEPA (High Efficiency Particle Air) filter, disposed in the exit port 435. The filter 432 is disposed at (or near) the exit port 435 to filter out regolith or unwanted solid particles that are bigger than the base-particles intended for sampling in the mass spectrometer 400. The ionizer and accelerator housing 412, angled magnet housing 414, detector housing 422 and magnet arrangement 416 are shown here for reference.

Figure 5C:
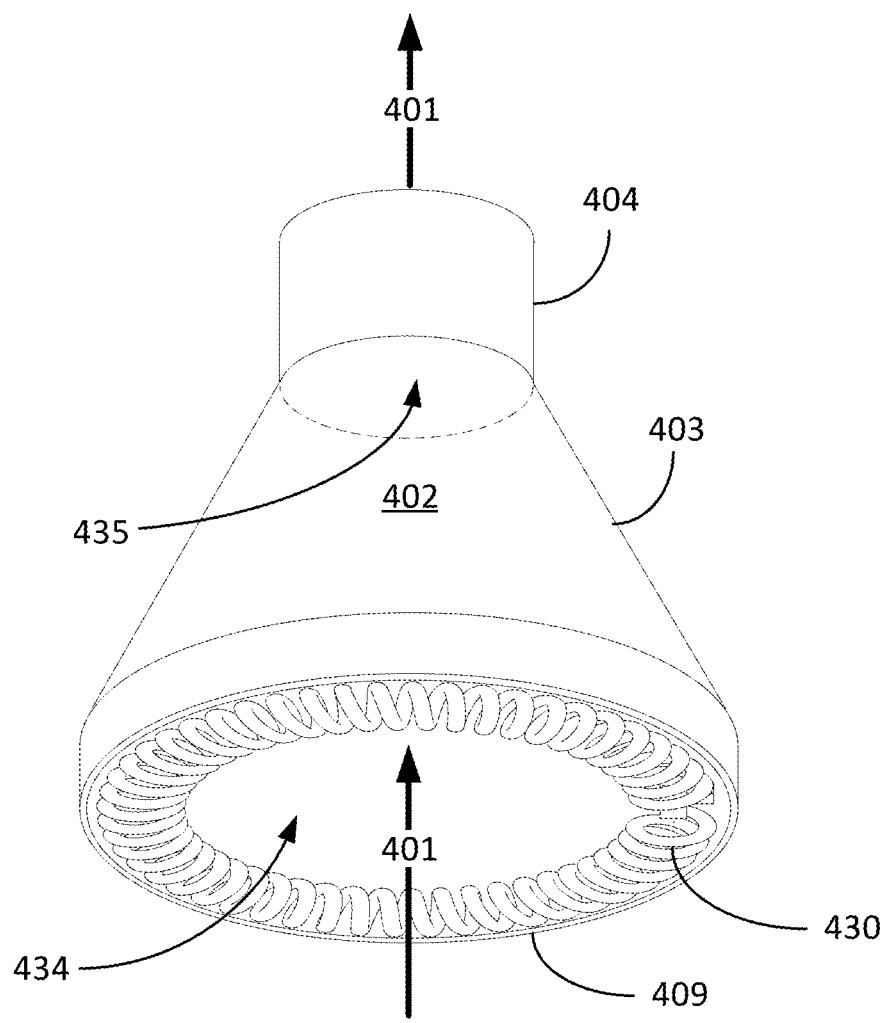

FIG. 5C is an isometric line drawing of the intake funnel 402 and funnel joiner 404 showing the base-particle pathway 401 leading into the intake port 434 and exiting out the funnel joiner 404. The funnel exit port 435 is hidden, thus shown by the dashed line. The heating element 430 is shown slightly extending from the funnel intake port rim 409.

Figure 5D:
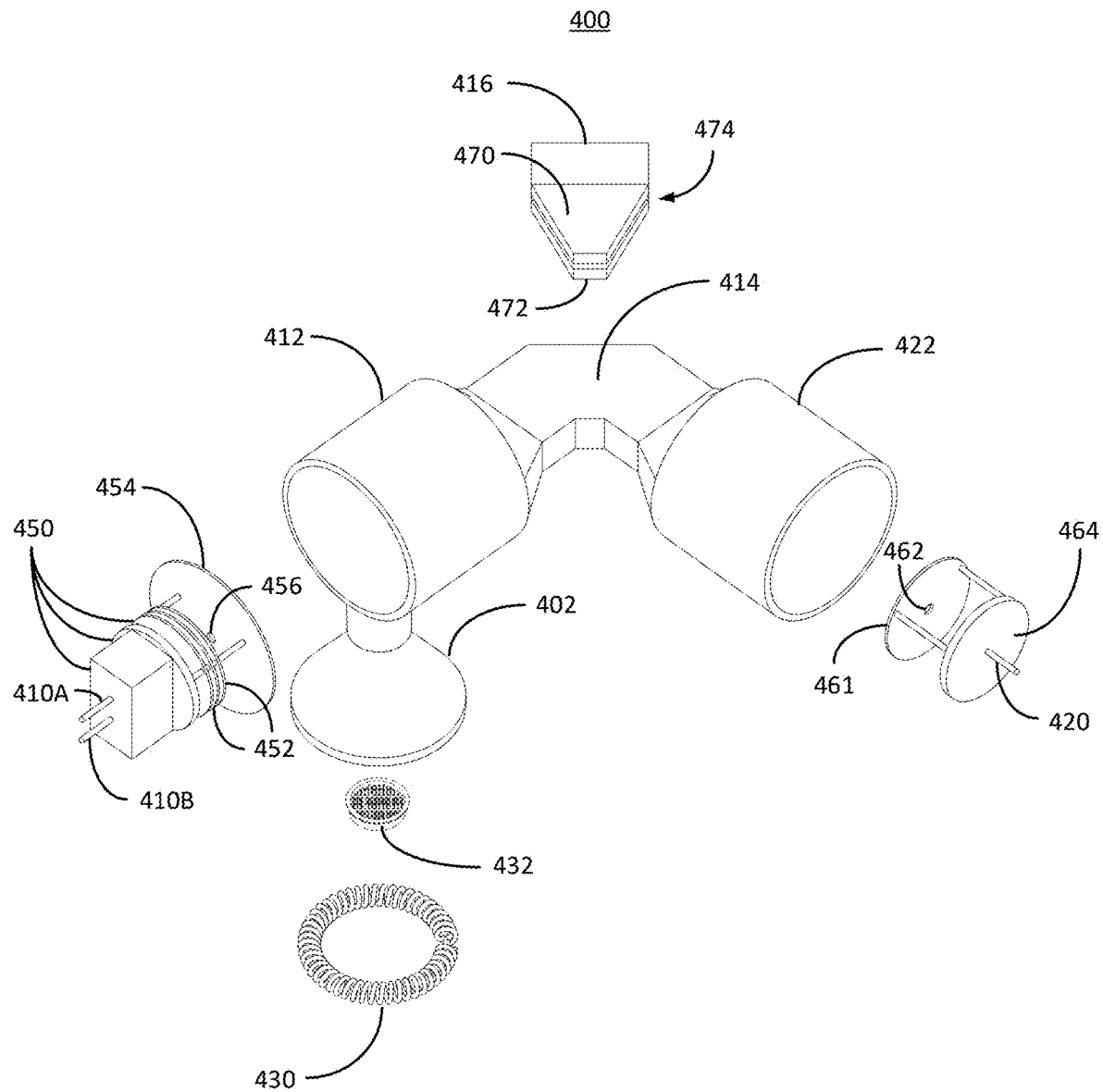

FIG. 5D is an exploded view of the mass spectrometer 400 consistent with embodiments of the present invention. With respect to the intake funnel arrangement 402, extending therefrom are the heating element 430 and the filter 432. To the left, an ionizer 450 with the ionizer leads 410A and 410B, a base-particle accelerator 452, a shield plate 545 and base-particle aperture 456 are shown extending from the ionizer and accelerator housing 412. The magnet arrangement 416 is shown extending behind the angled magnet housing 414. The magnet arrangement 416 generally comprises a first split-pole magnet 470 separated by a second split-pole magnet 472 by a gap 474. The base-particles 460, in this embodiment He-3, are aimed at the gap 474 and are redirected (at angle β+/−some offset) by the split-pole magnets 470 and 472 when passing through the post magnet tuning aperture 462. The redirected ionized base-particles 460B pass through a post magnet tuning aperture 462 in the post magnet tuning plate 461 along the way to the detector plate 464. The detector probe 420 picks up the signal of the He-3 from the detector plate 464 and relays the signal information to the computing system 216.

Figure 6A:
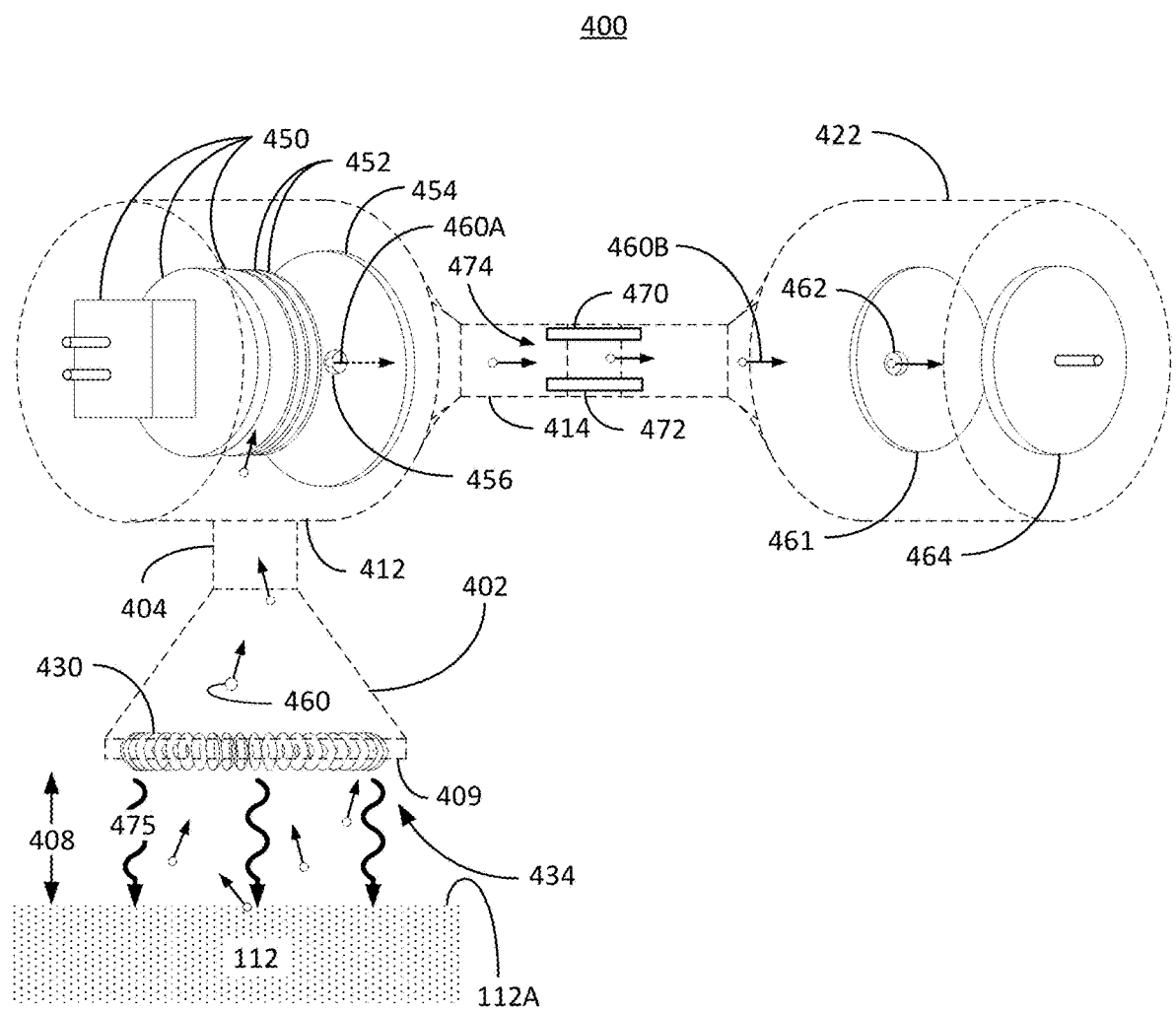
FIG. 6A is a line drawing depicting an embodiment of the components of the mass spectrometer 400 in action.
Figure 6B:
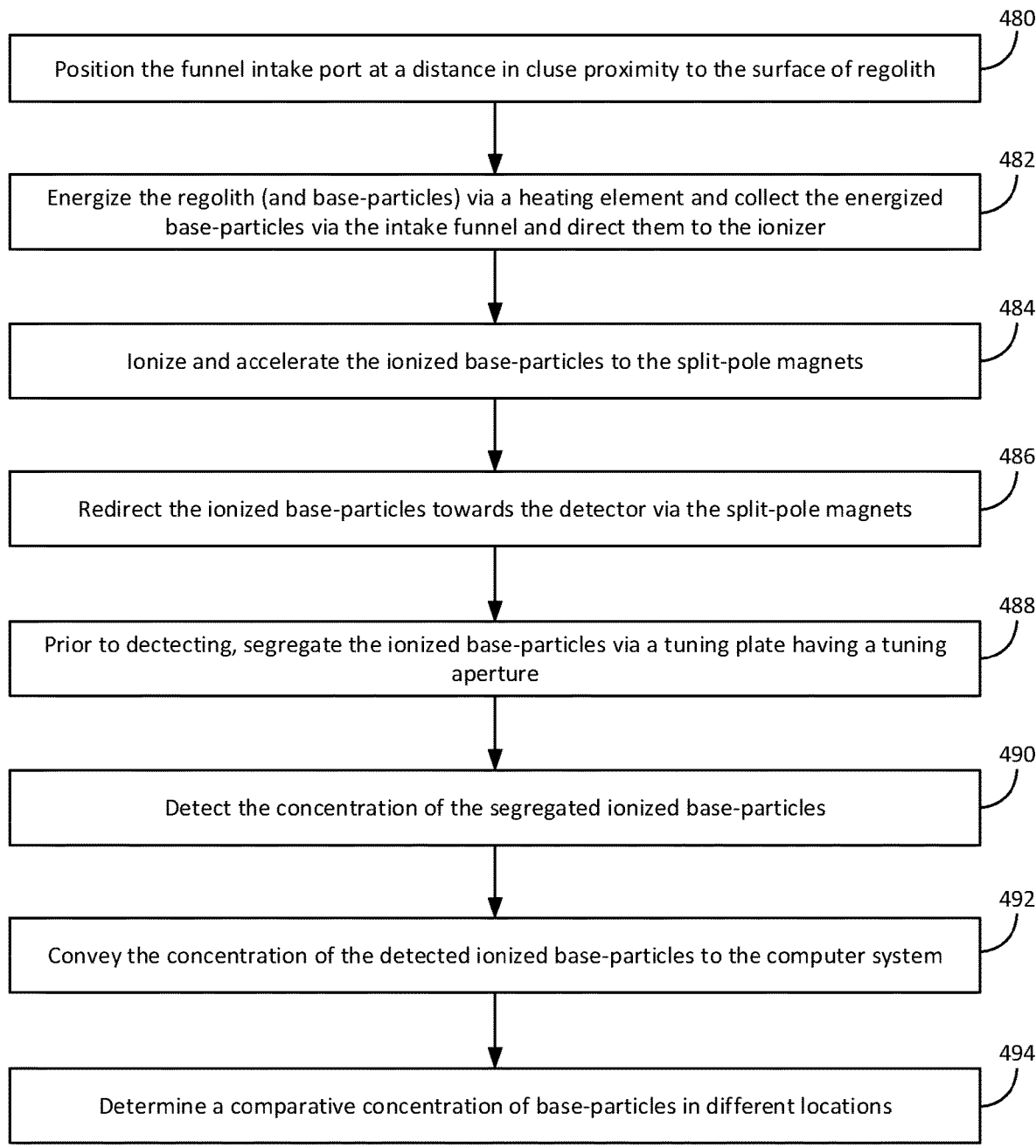
FIG. 6B is a block diagram of a method of using the open environment mass spectrometer.

FIG. 6A is a line drawing depicting an embodiment of the components of the mass spectrometer 400 in action. The embodiment described is a high-level explanation of the basic elements of the mass spectrometer 400, which depending on the design, can include more elements of exclude some of the elements shown for the sake of efficiency, which would be understood by those skilled in the art. The high-level explanation of FIG. 6A is described in-view of the block diagram FIG. 6B. The funnel intake port rim 409 is positioned at a distance 408 in close proximity to the regolith surface 112A, defined less than 12 inches (step 480). The heater 430, which is one embodiment for a granular surface disrupter, radiatively heats 475 the regolith 112 thereby releasing base-particles 460 retained in or on the regolith 112. Certain embodiments envision a shield (not shown) having a rim 409 that extends from the intake funnel 402 to the regolith surface 112A to shield and better collect a higher concentration of the liberated base-particles 460.

With continued reference to FIG. 6A, some of the liberated base-particles 460 are energized by the heat 475 to move through the intake funnel 402 and funnel joiner 404 into the ionizer housing 412 (step 482). The base-particles 460 are directed to an ionizer region in the ionizer 450 where electrons are emitted to bombard the base-particles 460 thus creating ionized base-particles 460A (step 484). The ionized base-particles 460A are accelerated via an electric field produced by the accelerator 452 and directed through an accelerator aperture 456 located in an accelerator tuning plate 454. The accelerated ionized base-particles 460A hurl towards the gap 474 in between the split-pole magnets 470 and 472 (step 486). The split-pole magnets 470 and 472 redirect or otherwise bend the trajectory of the ionized base-particles 160A in the angled magnet housing 414 in predictable angle β+/−some offset, depending on the mass of the ionized base-particle 160A (step 488). The present embodiment comprises a post magnet tuning plate 461 having a post magnet tuning aperture 462 that segregates the target post redirected ionized base-particle 160B (step 490). In the case of He-3, the post magnet tuning plate 461 has a post magnet tuning aperture 462 that segregates redirected ionized He-3 160B. The segregated post redirected ionized base-particles 160B, such as He-3, are detected by the detector plate 464, which conveys a number/concentration of the base-particles 160B in the sampled location of the regolith 112 (step 492). As the rover 102, or some other mobile carrier supporting the mass spectrometer 400, moves from location to location 152 to 154, for example, relative/comparative concentrations of target base-particles 160, such as He-3, can be established and at least stored at the mass spectrometer arrangement 300 if not transmitted to a remote receiver (not shown) via the antenna 212 (step 494). The comparative concentrations do not require an exact number of target base-particles 160 in a sampled area, rather a respective concentration of target base-particles 160, such as He-3, to better target high yield regions to mine.

Figure 7:
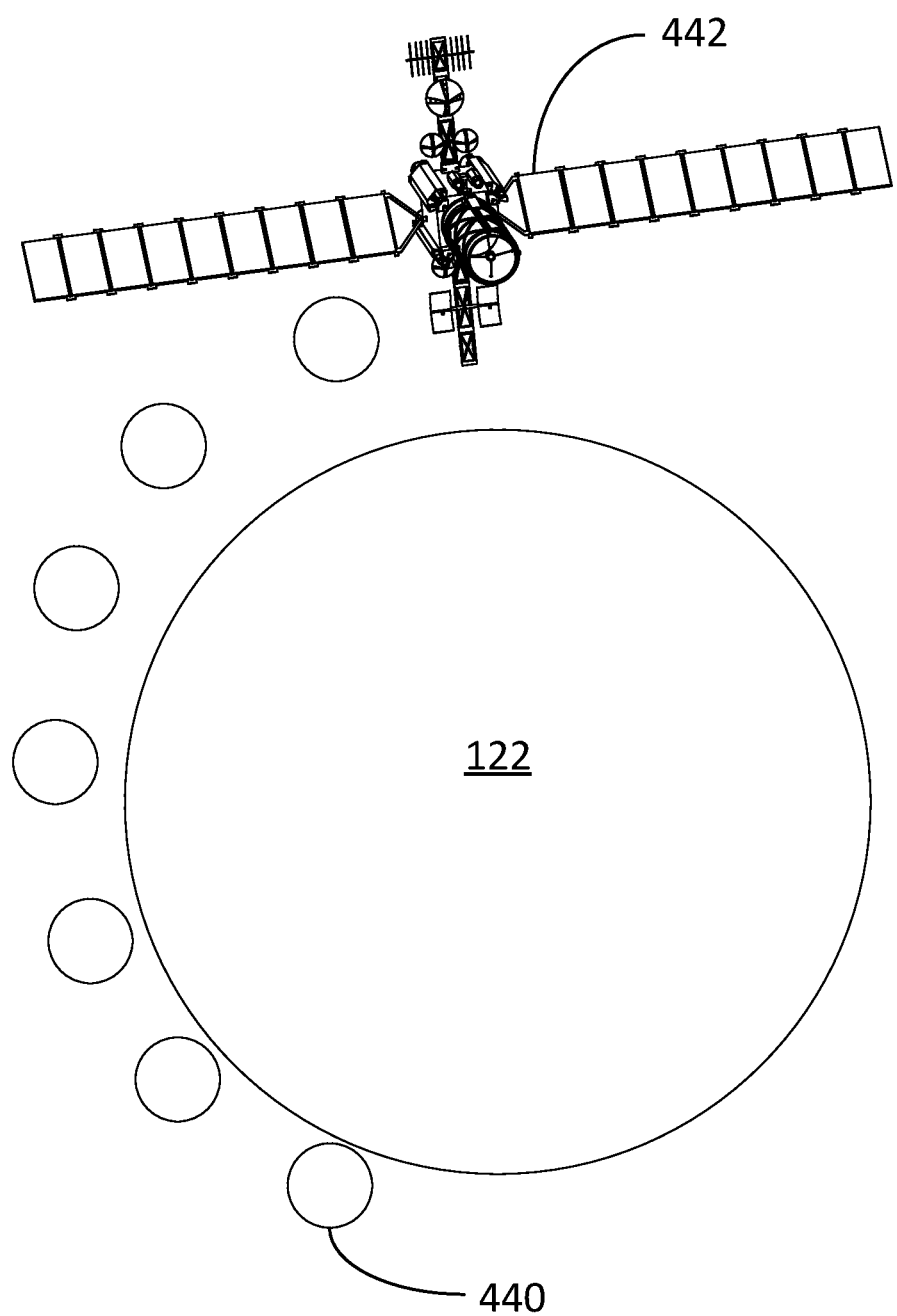
FIG. 7 is a line drawing that illustratively depicts an orbiting deployment vehicle deploying mass spectrometer dispersion pods on the surface of the Moon consistent with embodiments of the present invention.

FIG. 7 is a line drawing that illustratively depicts an orbiting deployment vehicle deploying mass spectrometer dispersion pods 330 consistent with embodiments of the present invention. Certain embodiments envision a deployment vehicle 440 that is orbiting around the Moon 122, or some other extraterrestrial body, deploying a plurality of the mass spectrometer dispersion pods 330 on various locations on the Moon 122. The mass spectrometer dispersion pods 330 can be, but is not necessarily, a onetime use device that transmits a concentration of target base-particles, such as He-3, back to the deployment vehicle 440 or to some other target location. The mass spectrometer dispersion pods 330 are further envisioned to be held level (maintain an upright orientation when landing) with a gyroscope or jet pack/s (not shown). Optionally, the mass spectrometer dispersion pods 330 can be equipped with a mechanical linkage (such as arms) that are configured to right the corresponding mass spectrometer dispersion pod 330 once it makes it to the Moon's surface 112A.

FIGS. 8A-8E are line drawings of another embodiment of a He-3 detector arrangement, which uses a nanosecond neutron analysis and associated particle imaging system (NNA/API), which acts as a neutron source, and a gamma ray (γ) detector system consistent with embodiments of the present invention. With respect to FIG. 8A, the He-3 detector arrangement 500 generally comprises a rover 102, or some other transport described above, that is configured to carry an NNA/API 502 and gamma ray detector system 504 to various locations on the Moon 122 or some other extraterrestrial body in search of sufficient concentrations of He-3 for mining. As shown, the NNA/API 502 and gamma ray detector system 504 are located at the baseplate 510 on the bottom end 508 of the rover 102. The rover 102 is depicted without a rover cover 108, which is shown in FIG. 1A, to better show the components for this He-3 detector arrangement 500. At the top end 506 of the arrangement 500 is a cosmic radiation shield 512 that covers the NNA/API 502 and gamma ray detector system 504. The cosmic radiation shield 512 blocks at least some of the gamma and neutron cosmic radiation that is more or less coming from above the arrangement 500, which contributes to noise in the detector system 504. More specifically, the cosmic gamma rays along with any additional gamma rays generated by the cosmic neutron radiation are not controlled and therefore are simply noise to the gamma ray detector 504. The cosmic radiation shield 512 further serves as a support platform for the batteries 210, the electronics and computing system 516 that operates or contributes to the operation of the arrangement 500, as shown. Also shown is the communications housing 214 with the antenna 212 and antenna connection line 213 extending therefrom. The shock absorbers 104, the suspension 105 and the wheels 106 are shown for reference.

Figure 8A:
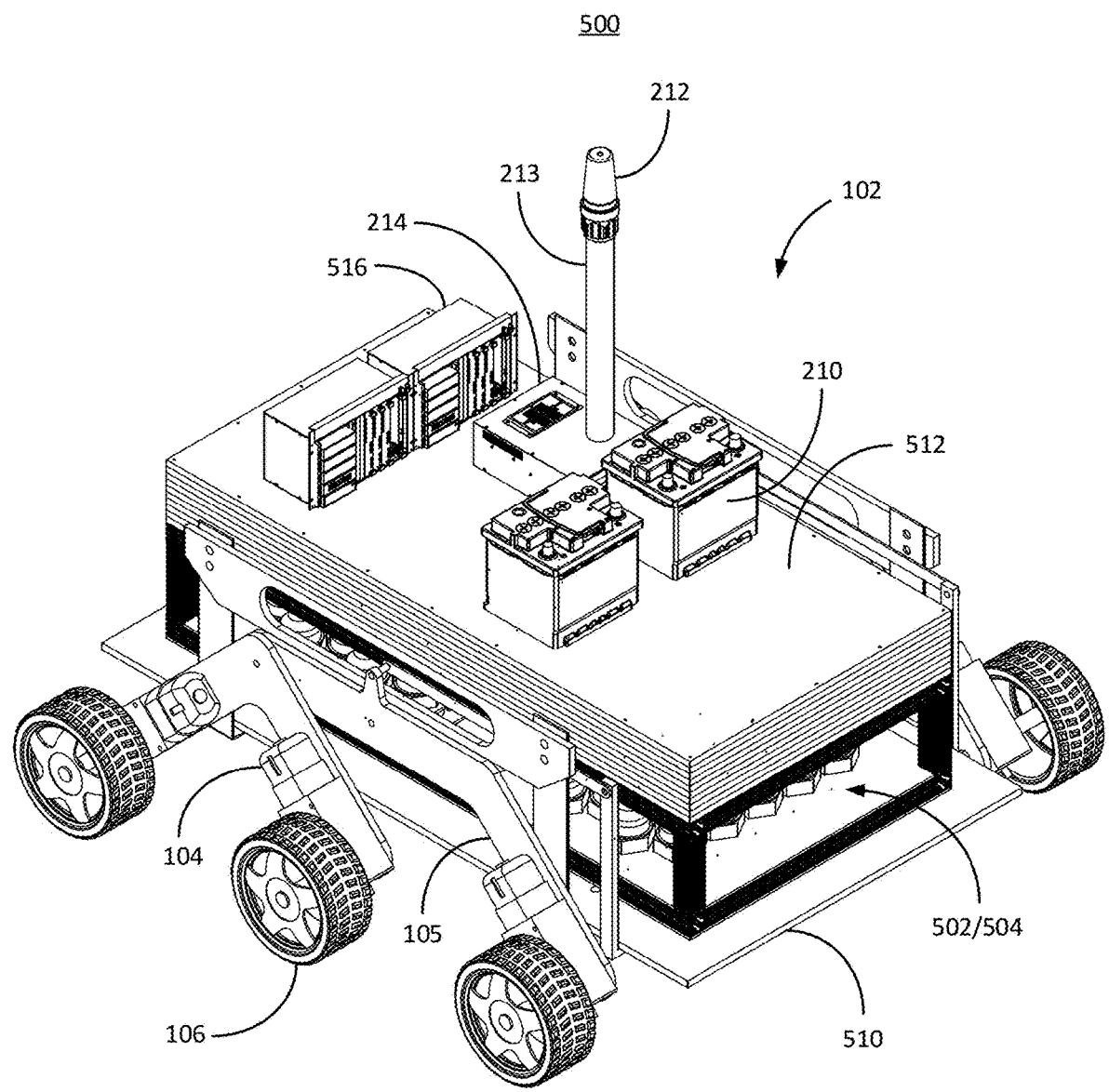
FIGS. 8A-8E are line drawings of another embodiment of a He-3 detector arrangement, which uses an NNA/API and gamma ray detector system consistent with embodiments of the present invention.
Figure 8B:
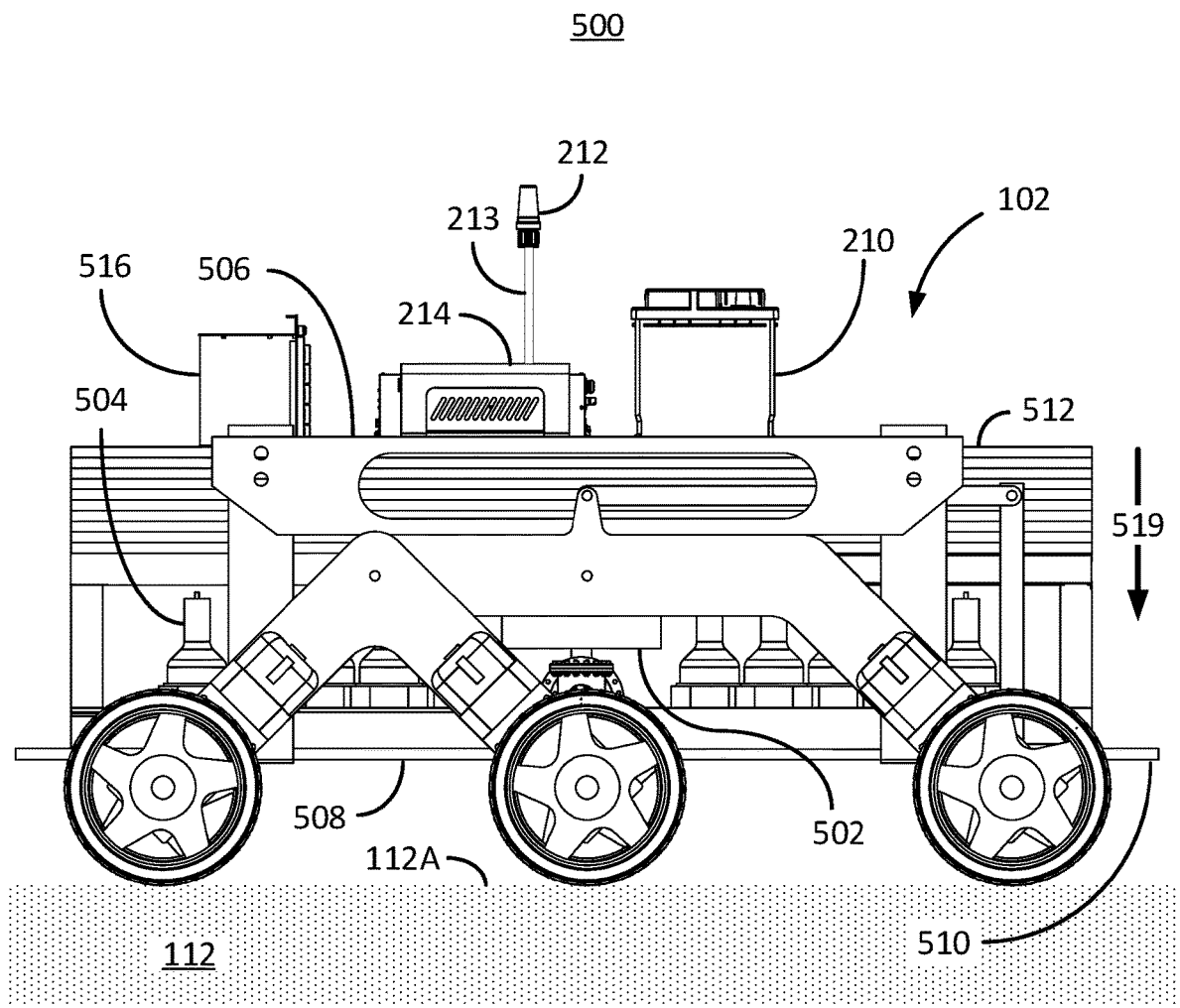

FIG. 8B is a side view line drawing of the He-3 detector arrangement 500 of FIG. 8A. As shown, there is one NNA/API 502, which aims neutrons 222 in a downward direction that penetrates the regolith 112 and a plurality of gamma ray detectors 504 that are on either side of the NNA/API 502 that detect the gamma rays 528 of interest from the neutron bombarded atoms in the regolith 112. The baseplate 510 is about 12 inches from the regolith surface 112A (as shown by the distance arrow 514 in FIG. 8C), however other embodiments envision the baseplate 510 being more than 12 inches or less than 12 inches from the regolith surface 112A, such as 2 inches or 2 feet away from the regolith surface 112A, for example. In this embodiment, the cosmic radiation shield 512 comprises a plurality of laminates, however a non-laminate cosmic radiation shield can be employed without departing from the scope and spirit of the present invention. As shown, the cosmic radiation shield 112 covers and shields the NNA/API 502 and the gamma ray detectors 504 from cosmic radiation emanating from above 516 the arrangement 100. Certain embodiments envision no cosmic radiation shield 112 but rather depend on the time window of neutron emission and gamma ray detection. The communications housing 214 with the antenna 212 and antenna connection line 213 extending therefrom are also prominently shown on top of the cosmic radiation shield 512.

Figure 8C:
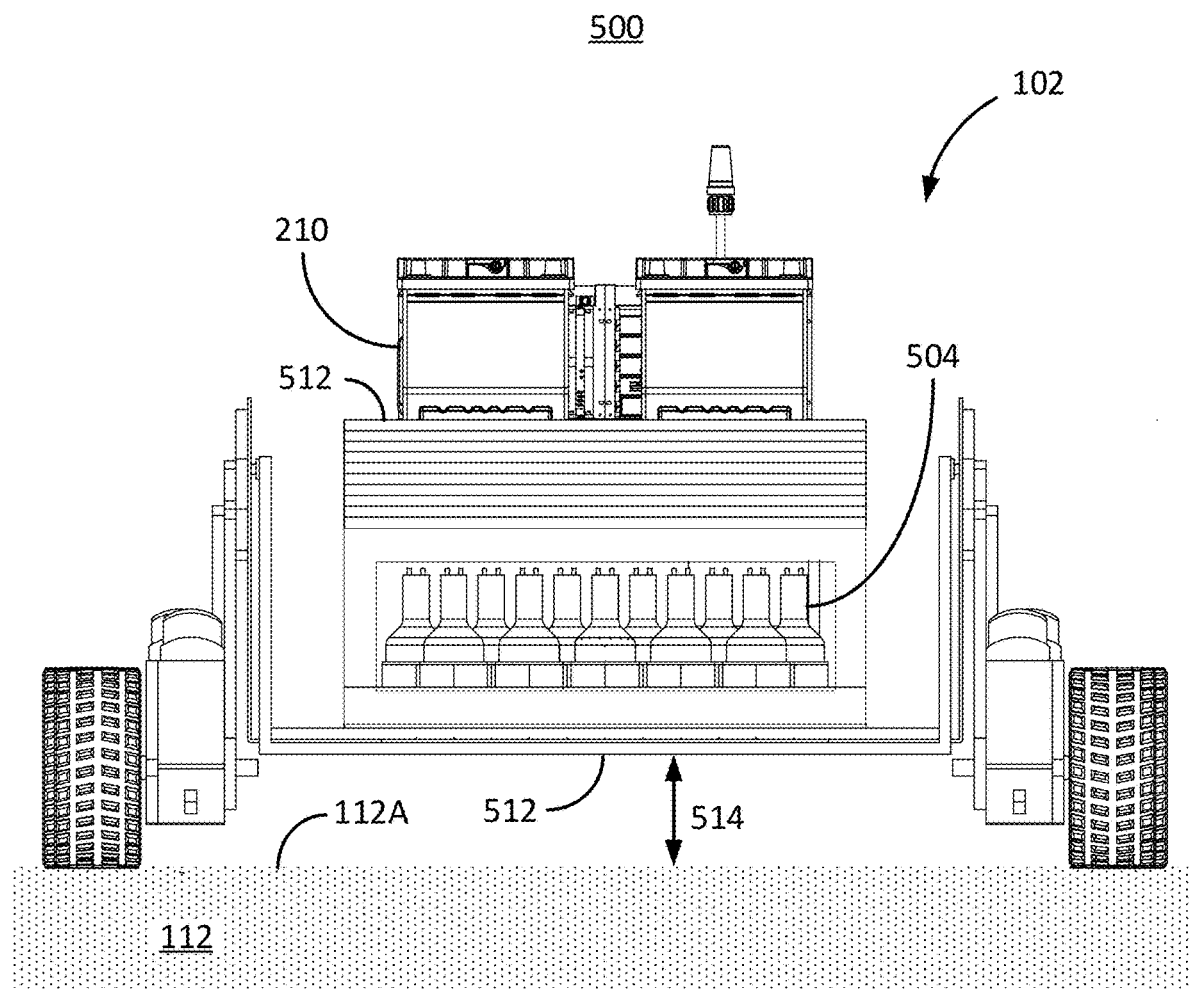

FIG. 8C is a front view line drawing of the He-3 detector arrangement 500 of FIG. 8A. The rover 102 is depicted on the regolith 112 with the baseplate 510 separated from the surface 112A at a distance 514 between 2-24 inches, but as mentioned above, other distances are contemplated. From this perspective, the plurality of gamma ray detectors 504 are shown under the cosmic radiation shield 512, which is shown supporting the batteries 210 and other electronics.

Figure 8D:
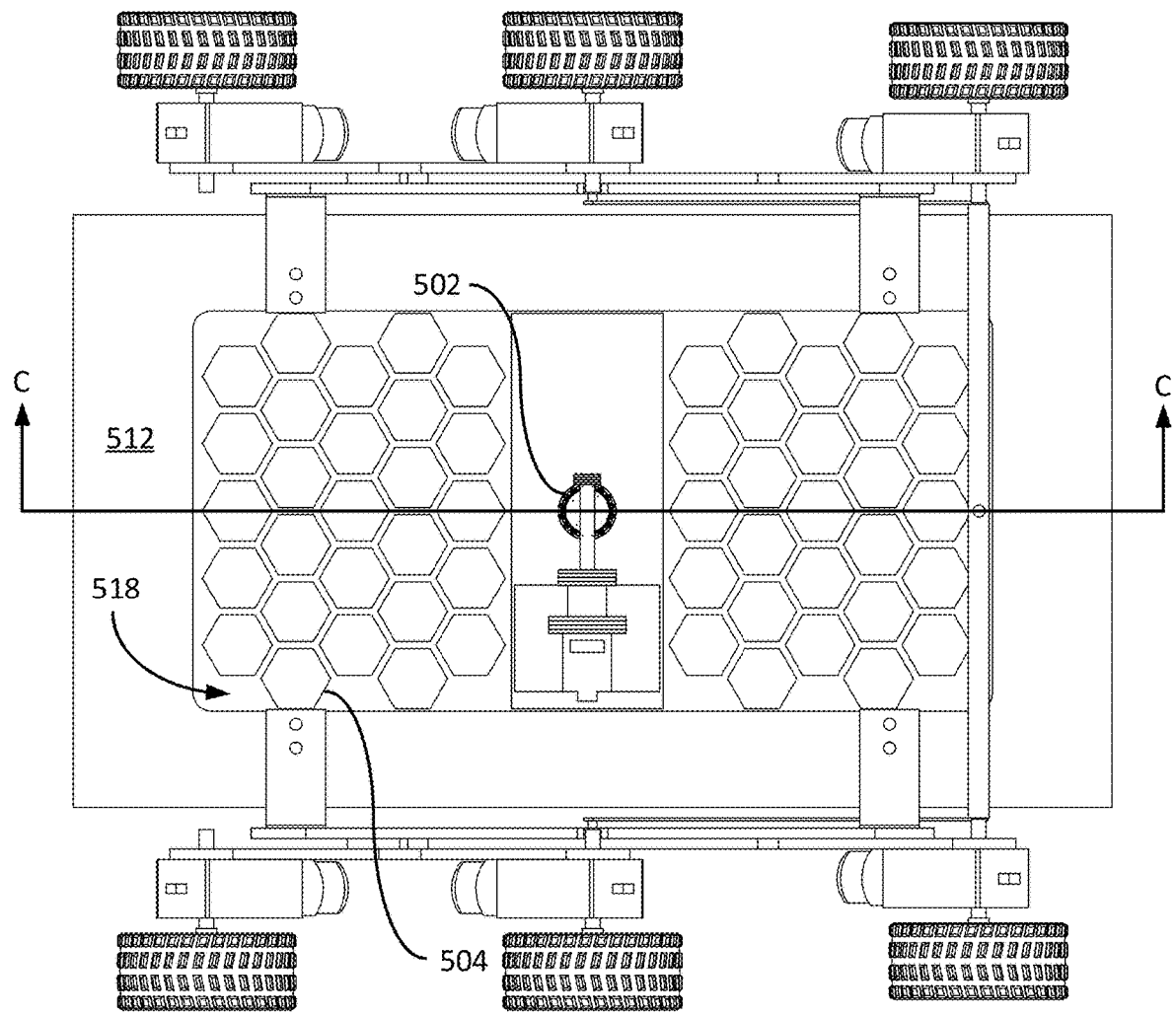

FIG. 8D is a bottom view line drawing of the He-3 detector arrangement 500 of FIG. 8A. As shown, there is an opening 518 in the baseplate 512 to provide an unobstructed pathway for the neutrons 222 emitted from the NNA/API 502. The NNA/API 502 is in the center of the plurality of gamma ray detectors 504. In this embodiment, there are a plurality of gamma ray detectors 504 to increase the detection signal fidelity due to the increased probability of detecting back-scattered gamma rays 528 from the impacted target material, for example ilmenite 530, in the regolith 112. The gamma rays 528 are produced by the neutrons 526 emitted by the NNA/API 502 interacting with the regolith 112. Some embodiments envision no baseplate opening 518, which depends on the emitted neutrons 526 and the returning gamma rays 528 simply passing through the baseplate 512.

Figure 8E:
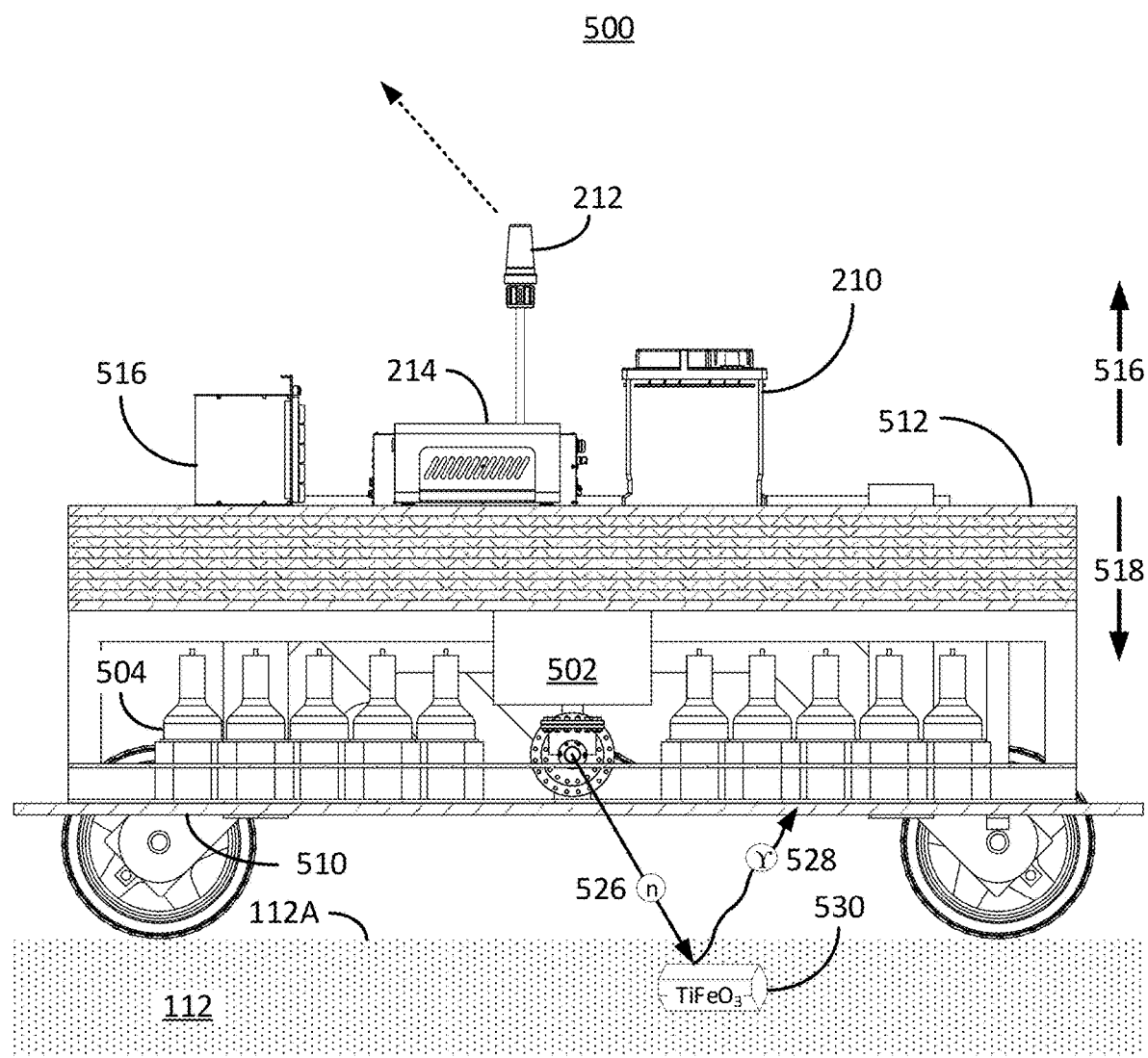

FIG. 8E is a cross section view of the He-3 detector arrangement 500 along the cross-section cut-line C-C of FIG. 8D. The NNA/API 502 is commercially available form several sources including an API 120 Neutron Generator from ThermoFisher Scientific, headquartered in Waltham, MA. or a DT 108 Neutron Generator from Adelphi Technology Inc. It should be appreciated that these NNA/APIs can be used 'as is' or can be modified without vacuum pumps and chambers to take advantage of the low ambient pressure (such as, for example below 7 millitorr) on the Moon 122 or on an extra-terrestrial body substantially devoid of an atmosphere compared to Earth.

From a high-level perspective, one type of NNA/API can be a deuterium-tritium particle generator, which can comprise a deuterium filament (i.e., a block of deuterium rich material) that is heated up, subjected to a magnetic field and an electron producing cathode, which strips the deuterium atoms of their electrons to charge the deuterium atoms. The magnetic field accelerates the charged deuterium atoms to a tritium target (i.e., a block of tritium rich material), which causes deuterium/tritium collisions. Though the collisions disperse neutrons in all directions, a pseudo-beam can be selected which is associated with the alpha particles detected by the position sensitive alpha detector. By leaving the power on to the NNA/API, neutrons are continuously produced. By adjusting the current passing through the filament, neutron production can be controlled.

In operation, when deuterium fuses with tritium in the tritium target, a 14.1 MeV neutron and a 3.5 MeV alpha particle are produced. The alpha particle's position and time of arrival is measured. The neutrons that penetrate the regolith 112 collide with atoms in the regolith, putting their respective nuclei in an excited state. When each of the nuclei decays into its ground state, one or more gamma-rays are emitted. The energy and timing of the gamma-ray(s) are measured by the gamma-ray detector, which in the present embodiment is tuned for at least titanium, which is one of the constituents of the mineral ilmenite ($FeTiO_3$). When an alpha particle and gamma-ray are observed within a very small window of time (under 80 ns), they are considered to originate from the same fusion reaction. The velocity of the neutron and gamma-ray are known, as is the trajectory of the associated alpha particle (and therefore the neutron, which travels in the opposite direction as the neutron), so the location of the neutron-nucleus interaction can be calculated. The energies of the gamma-rays are unique to the specific type of atom that was temporarily fused with the neutron, and so may be used to identify the elements/atoms of interest, which in this case is ilmenite. Ilmenite is associated with He-3. Over many observed interactions, a three-dimensional mapping of ilmenite can be computed. In some embodiment, the detectors 504 are all tuned for titanium. In other embodiments, at least some of the detectors 504 are tuned for titanium and other detectors 504 are tuned for iron. In yet other embodiments, the detectors 504 are tuned for both titanium and iron. Still, other embodiments contemplate the detectors 504 being tuned for titanium and iron and oxygen, with the electronics of the arrangement being able to determine ratios of the elements detected to insinuate the presence of ilmenite. In this way, regions of the Moon 122 can be mapped with concentrations of Ti and possibly ilmenite.

Figure 9:
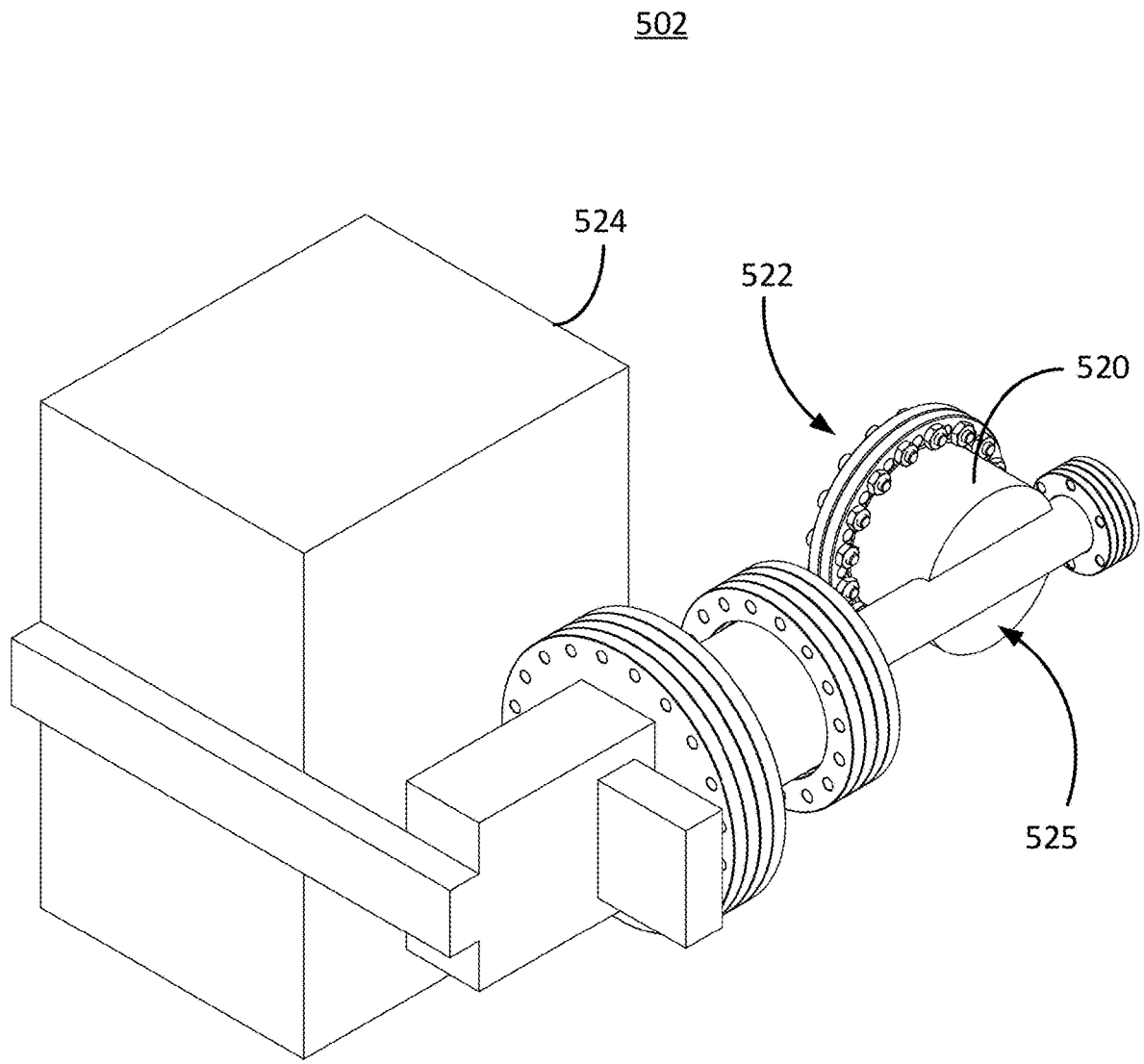
FIG. 9 is a line drawing illustratively depicting an NNA/API consistent with embodiments of the present invention.

FIG. 9 is a line drawing illustratively depicting an NNA/API consistent with embodiments of the present invention. As shown, the NNA/API 502 comprises a target chamber 520 that has a phosphor coated window with a photo diode connected therewith. The photo diode detects when an alpha particle hits the phosphor window 522 via a position sanative photo-multiplier (which picks up the phosphorus signal), that sits right outside of the phosphor window 522. The alpha particle is co-generated with the neutron and travels in the direction opposite the neutron. The timing of the neutron is easily calculated based on the detection of the neutron's associated alpha particle, hence, the timing of the resultant gamma ray 528 must be in a tight window of time (nanoseconds) when the alpha particle is detected. Because the window of time is so small, there is a high probability that the resultant gamma ray 528 is from the neutron emitted from the NNA/API 502. In some embodiments of the present invention, the detector 504 looks for the resultant gamma ray from a decaying atom in ilmenite within a short time window from sensing the alpha particle. It should be appreciated that the time it takes for the gamma ray 528 to be detected is indicative of the depth that the neutron penetrated the regolith 112. Because the resolution of detection drops off mathematically as a function of $1/r^2$, certain embodiments employ multiple gamma ray detectors 504 to improve an understanding of depth and increase the probability of intercepting an emitted gamma ray 528. Also, the short time window associated with the alpha particle and the resultant gamma ray 528 filters out much of the background noise from the randomly received cosmic radiation. Electronics 524 specific to the NNA/API 502 provides the timing, logic, power, etc. to run the NNA/API 502. Because the NNA/API 502 is already in a low-pressure environment (sub 7 millitorr), a pressure chamber and pump system that exists on all NNA/APIs is not integrated does not exist in some embodiment of the present invention. However, a filter system is incorporated to prevent dust from getting into the path of the neutron beam in the NNA/API 502, which is not an issue with a vacuum system.

Figure 10:
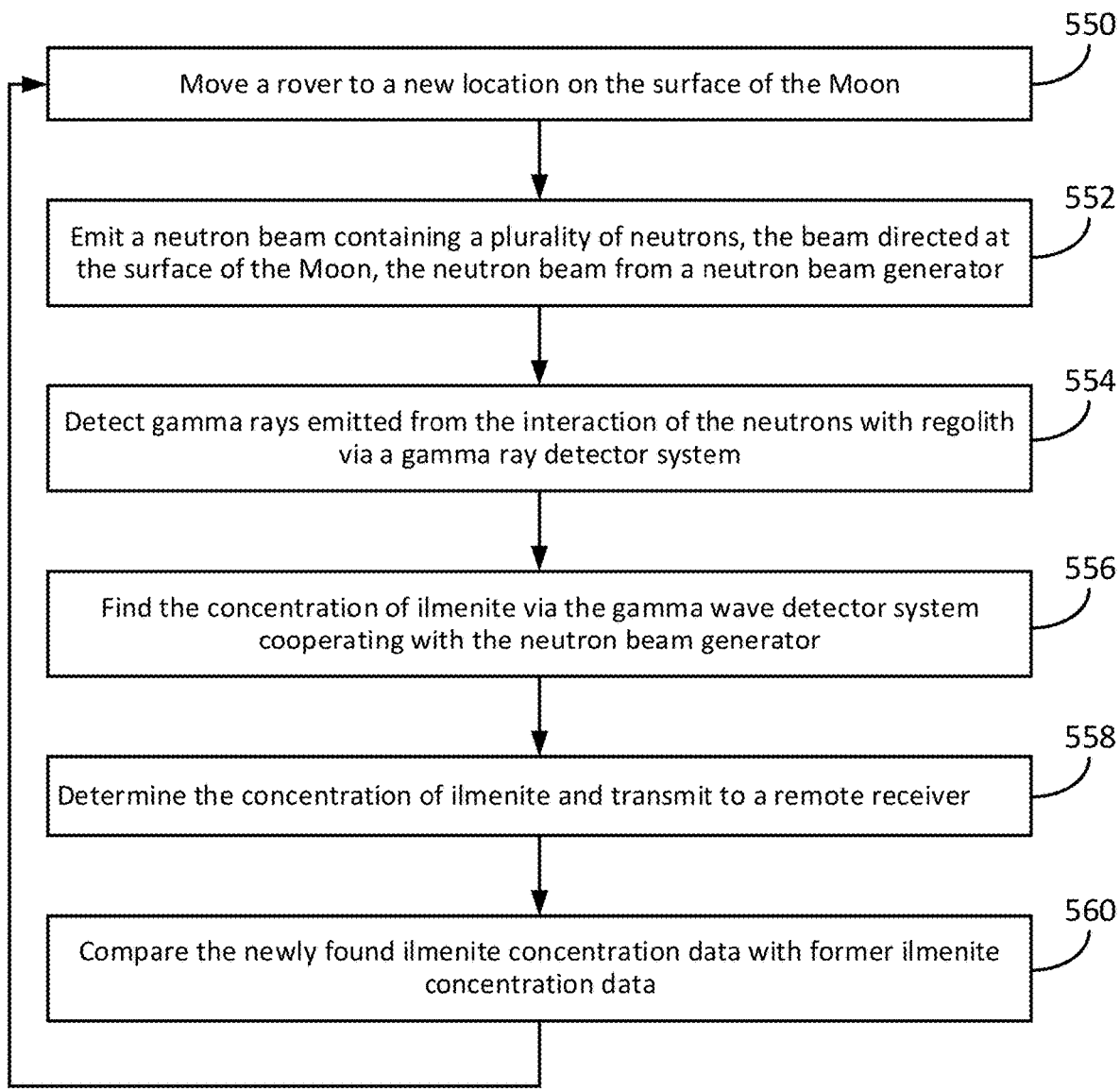
FIG. 10 is a method for finding He-3 on an extraterrestrial body via association of titanium consistent with embodiments of the present invention.

FIG. 10 is a method for finding He-3 on an extra-terrestrial body via association of titanium consistent with embodiments of the present invention. The method uses the ilmenite detector arrangement of FIGS. 8A-8E with a step for moving the rover 102 from a first location to a second location on a surface of the Moon 122 or some other extra-terrestrial body, step 550. When the rover 102 is at a location of interest, the NNA/API 502 emits a neutron beam of a plurality of neutrons 526 directed at the surface 112A of the Moon 122, which penetrates the surface 112A and into the regolith 112, step 552. The neutrons 526 interact with the regolith 112 to emit gamma rays 528, which are detected within a tight window of time (under 100 ns) by the gamma ray detector system 504, step 554. The gamma ray detector system 504 can be tuned to filter for one or more components of ilmenite. Optionally, the gamma ray detector system 504 along with the signal processing electronics can be arranged and configured to identify the energy consistent with titanium and or other elements of interest (Fe and O). The gamma ray detection system 504 can further include an onboard computer allowing for active identification of characteristic gamma rays, including those from titanium and/or iron and in some cases identify a ratio of these elements, which is consistent with the presence of ilmenite. Optionally, the computing system 516 on the rover 102 can be made to isolate one or more components of ilmenite and determine the presence of ilmenite and the concentration of ilmenite at the first location. Either way, concentration of ilmenite is found through the gamma ray detector system 504 cooperating with the NNA/API 502, step 556. The concentration of ilmenite 530, or at least the raw data, which can be used to determine the present and concentration of ilmenite 530, is transmitted to a remote receiver, such as that which might be on an orbiting satellite 440, from FIG. 7, step 558. When the data is collected and sent from the first location 152, the rover 102 moves to a second location 154 where the steps are repeated. The ilmenite concentration data from the first location 152 is compared with the second location 154 to map out mining regions of interest to mine He-3 (He-3 target mining locations) because He-3 associates strongly with ilmenite, step 560. Hence, this method example used to find high concentrations of ilmenite or at least titanium offers He-3 target mining locations on the Moon 122 to streamline Moon mining operations.

With the present description in mind, below are some examples of certain embodiments illustratively complementing some of the apparatus embodiments discussed above and presented in the figures to aid the reader. Accordingly, the elements called out below are provided by example to aid in the understanding of the present invention and should not be considered limiting. The reader will appreciate that the below elements and configurations can be interchangeable within the scope and spirit of the present invention. The illustrative embodiments can include elements from the figures.

In that light, certain embodiments of the present invention envision an associated particle imaging arrangement 500 for detecting ilmenite 530 as shown in FIGS. 8A-8C, the arrangement 500 comprising a transport 102 that carries an NNA/API 502 and at least one gamma ray detector 504, and a cosmic radiation shield 512. The transport 102 is defined by a top end 506 and a bottom end 508, wherein said bottom end 508 is configured to interface a surface 112A of an extra-terrestrial body 122. The transport 102 is configured to be moved in different locations 152/154 on said surface 112A of said extra-terrestrial body 122. The NNA/API 502 comprises a neutron emitter 520 configured to aim a cone of neutrons 126 towards said surface 112A of said extra-terrestrial body 122 from said bottom end 508. The NNA/API 502 is devoid of a vacuum chamber adapted that would otherwise maintain a pressure that is lower than an ambient environment to the arrangement 500. The at least one gamma ray detector 504 comprises a gamma band filter that that does not block titanium or iron. Optionally, at least one gamma ray detector 504 along with the signal processing electronics comprise a gamma ray detection system. The gamma ray detection system can further include an onboard computer allowing for active identification of characteristic gamma rays, including those from titanium and/or iron and in some cases identify a ratio of these elements which is consistent with the presence of ilmenite. The at least one gamma ray detector 504 is configured to substantially detect concentration information of said titanium and/or said iron in a ratio that is consistent with said ilmenite 530. The arrangement 500 further comprises a cosmic radiation shield 512 that covers said NNA/API 502 and said at least one gamma ray detector 504, wherein said cosmic radiation shield 512 is configured to at least shield a portion of cosmic radiation that comprises cosmic gamma radiation and cosmic neutron radiation. The cosmic radiation shield 512 is disposed at said top end 506 of said transport 102. The arrangement 500 further comprises an energy source 210 that is configured to provide energy to said NNA/API 502 and said at least one gamma ray detector 504. The arrangement also comprises non-transient memory that is connected to said at least one gamma ray detector 504, wherein said non-transient memory is configured to retain said concentration information. A transmitter 212 in the arrangement 500 is configured to transmit said concentration information to a remote receiver 440.

The at least one gamma ray detector 504 in the arrangement 500 is further imagined to be tuned to substantially detect concentrations of titanium and iron at a depth of 3 feet.

The at least one gamma ray detector 504 in the arrangement 500 is further imagined to be within 12 inches of said surface 112A of said extra-terrestrial body 122.

It is further imagined that in the arrangement 500 said ilmenite 530 is in regolith 112 and said extra-terrestrial body is the Moon 122.

The NNA/API 502 and said at least one gamma ray detector 504 of the arrangement 500 is also envisioned to comprise at least one inner chamber 525 that is devoid of external contamination because said NNA/API 502 and said at least one gamma ray detector 504 comprise a filtration system. Despite not having a vacuum system, said at least one inner chamber 525 is at a pressure below 7 millitorr.

The arrangement 500 contemplates that said transport 102 can be selected from a group consisting of a rover, a dispersion pod, a skipper, or a hand-held transport.

The arrangement 500 can further comprise first concentration information of said titanium at a first location 152 of said extra-terrestrial body 122 and second concentration information of said titanium at a second location 154 on said extra-terrestrial body 122, wherein said arrangement 500 further comprises a computer processor 516 that compares said first concentration with said second concentration.

The cosmic radiation shield 512 in the arrangement 500 can be metallic (such as iron or lead, for example).

In another aspect of the present invention, some embodiments envision an ilmenite detector arrangement 500 that uses associated particle imaging, the ilmenite detector arrangement 500 comprising a rover 102, an NNA/API 502 and a gamma ray detector 504. The NNA/API 502 comprises a neutron emitter 520 that is configured to aim a cone of neutrons 526 towards a surface 112A of an extra-terrestrial body 122 from said rover 102. The NNA/API 502 is devoid of a vacuum chamber. The gamma ray detector 504 is configured to detect concentrations of titanium and iron, wherein said titanium and said iron concentrations are from within 12 inches of said surface 112A of said extra-terrestrial body 122. The gamma ray detector 504 is configured to detect said titanium concentrations via gamma radiation 528 emitted from said surface 112A due to neutrons 526 impinging said surface 112A from said cone of neutrons 526. The ilmenite detector arrangement 500 further comprises a cosmic radiation shield 512, a computing processor 516 and a transmitter 212. The cosmic radiation shield 512 covers said NNA/API 502 and said gamma ray detector 504 from at least a portion of both gamma and neutron cosmic radiation. The computing processor 516 is configured and arranged to determine if said concentrations of titanium and iron comprises a ratio that is consistent with ilmenite 530. The transmitter is configured and arranged to transmit said concentration information to a remote receiver. The rover 102 is configured to carry the ilmenite detector arrangement 500 to different locations 152/154 on the surface 112A.

The ilmenite detector arrangement 500 can further comprise an energy source 210 that is disposed on said rover 102, the energy source being connected to and configured to provide energy to said NNA/API 502.

The ilmenite detector arrangement 500 can further comprise non-transient memory that is connected to said alpha detector and further configured to retain concentration information of said titanium.

The ilmenite detector arrangement 500 of claim 10 can further comprise other gamma ray detectors 504.

The ilmenite detector arrangement 500 further imagines said NNA/API 502 and said gamma ray detector 504 being within 12 inches from the surface 112A.

The ilmenite detector arrangement 500 can further comprise first concentration information of said titanium at a first location 152 of said extra-terrestrial body 122 and second concentration information of said titanium at a second location 154 on said extra-terrestrial body 122. The ilmenite detector arrangement 500 further comprises a computer processor 516 that compares said first concentration with said second concentration.

The NNA/API 502 of the ilmenite detector arrangement 500 is envisioned to further comprise at least one inner chamber 525 that is held at a pressure below 7 millitorr.

The ilmenite detector arrangement 500 further imagines that said ilmenite 530 is in regolith 112 and said extra-terrestrial body is the Moon 122.

Another embodiment of the present invention contemplates a method as viewed with FIGS. 8A-8E and 10 comprising moving a rover 102 from a first location 152 to a second location 154 on the Moon 122; emitting a neutron beam 526 of a plurality of neutrons at a surface 112A in said first location 152; detecting gamma rays 528 from decaying unstable titanium atoms and iron atoms bombarded with said neutrons from said neutron beam 526; determining a ratio of said titanium atoms to said iron atoms from gamma rays 528; and establishing that said ratio corresponds to ilmenite 530.

The method can further comprise repeating said emitting step, said detecting step, said determining step and said establishing step in said second location 154.

The method can further comprise establishing a concentration of said ilmenite 530 in said first and said second locations.

Another embodiment of the present invention envisions a mass spectrometer arrangement 300 (as shown in FIGS. 4A-4C) that comprises a mass spectrometer 400 carried around on a mobile carrier 102. The mass spectrometer 400 (As depicted in FIGS. 5A-5D) comprises a base-particle pathway 401 defined as beginning from an intake port 434 and ending at a detector plate 464. The particle pathway 401 traverses through the mass spectrometer 400. The mass spectrometer 400 further comprises an intake funnel 402 having a funnel shaped housing 403 that extends from the intake port 434 to an exit port 435, wherein the exit port 435 is smaller than the intake port 434. The intake port 434 is unobstructed from directly interfacing an open environment 405 and is configured to be in communication with the open environment 405 during operation. The mass spectrometer 400 further comprises an ionizer 450 adjacent to the exit port 435, wherein the mass spectrometer ionizer 450 is configured to ionize base-particles 460 in a portion of the base-particle pathway 401. The mass spectrometer 400 further comprises a detector housing 422 that comprises the detector plate 464 and an angled housing 418 having split-pole magnets 470 and 472 that are configured to direct the base-particles 460 at an angle β+/−an offset, such as less than 10 degrees, along the base-particle pathway 401. The mass spectrometer arrangement 300, and in some embodiments, the intake funnel 402, has a granular surface disrupter 430 configured to liberate the base-particles 460 from a granular surface 112 that is external to the mass spectrometer arrangement 300. The mass spectrometer arrangement 300 comprises a mobile carrier 102 that supports the mass spectrometer 400. The mobile carrier 102 is configured to position the intake port 434 over the exterior granular surface 112.

The mass spectrometer arrangement 300 is envision having the mass spectrometer arrangement 300 being devoid of a pressure chamber adapted to maintain a pressure that is lower than the open environment 405.

Certain embodiment of the mass spectrometer arrangement 300 envision the granular surface disrupter 430 being a heating element.

Certain embodiment of the mass spectrometer arrangement 300 envision the exit port 435 being at least one-half the area of the intake port 434.

Certain embodiment of the mass spectrometer arrangement 300 envision the open environment 405 being below 7 millitorr.

Certain embodiment of the mass spectrometer arrangement 300 envision the base-particles 460 include helium-3 and the mass spectrometer 400 being tuned to the He-3.

Certain embodiment of the mass spectrometer arrangement 300 envision the mobile carrier being selected from a group consisting of a rover 102, a dispersion pod 440, a skipper 120, or a hand-held carrier 224.

Certain embodiment of the mass spectrometer arrangement 300 envision the mobile carrier being configured to position the intake port 434 within 6 inches of the exterior granular surface 112A.

Certain embodiment of the mass spectrometer arrangement 300 envision the mass spectrometer arrangement 300 being configured to determine a concentration of He-3 in the granular soil 112 at a second location 154 and at a first location 152. This can further comprising a wireless communicator that comprises an antenna 212 and transmitter 214 configured to communicate the concentration to a receiver (not shown).

Another embodiment of the present invention envisions a mass spectrometer system 300 comprising a mass spectrometer 400, a heating element 430, and a mobile carrier 102. The mass spectrometer 400 can comprise a channel 401 that extends through the mass spectrometer system 200 from an intake port 434 to a detector 464. The mass spectrometer 400 can further comprise an intake funnel 402 comprising an intake port 434 configured to receive base-particles 460 directly from an open environment 405, the intake funnel 402 configured to direct the base particles 460 to an exit port 435. The mass spectrometer 400 can further comprise an ionizer 450 that is configured to ionize the base-particles 460 received from the exit port 435. The mass spectrometer 400 also comprises split-pole magnets 470 and 472 that are disposed in an angled housing 418 between the ionizer 450 and the detector 464. A heating element 430, which can be in the mass spectrometer 400 or elsewhere in the system 300, is configured to liberate the base-particles 460 from a granular surface 112 via heat. The granular surface is not part of the mass spectrometer system 300. The system 300 envisions a mobile carrier 102 configured to position the intake port 434 in close proximity to the exterior granular surface 112.

Some embodiments of the mass spectrometer system 300 further envision the exit port 435 being smaller than the intake port 434.

Certain embodiments of the mass spectrometer system 300 further envision the intake port 434 being in communication with the open environment 405 during operation, wherein there is no pressure chamber associated with the mass spectrometer system 300. Associated is defined herein to be part of the system 300 or having a direct cooperating relationship with the system 300.

Certain embodiments of the mass spectrometer system 300 envision the mass spectrometer 400 further comprising an accelerator between the ionizer 450 and the split-pole magnets 470 and 472.

Some embodiments of the mass spectrometer system 300 further the split-pole magnets 470 and 472 being configured to direct the base-particles 460 at an angle β+/−an offset (defined as less than 10 degrees) along the base-particle pathway 401.

Some embodiments of the mass spectrometer system 300 further envision the mass spectrometer 400 being tuned to determine a concentration of He-3 in the exterior granular surface 112 at a second location 154 and at a first location 152.

Certain embodiments of the mass spectrometer system 300 envision the mobile carrier being selected from a group consisting of a rover 102, a dispersion pod 490, a skipper 120, or a hand-held carrier 224.

Some embodiments of the mass spectrometer system 300 envision the open environment 405 being below 7 millitorr.

In yet another embodiment of the present invention, an open environmental mass spectrometer arrangement 300 is envisioned to comprise a mass spectrometer 400 being positioned and supported by a mobile carrier 102. The mass spectrometer 400 can have an intake funnel 402 that is configured to receive base-particles 460 through an intake port 434 directly from an open environment 405. The intake funnel 402 is configured to direct the base particle 460 into the mass spectrometer 400. The arrangement 300 can further comprise a heating element 430 configured to liberate the base-particles 460 from regolith 112 via heat, the regolith 112 is not part of the open environmental mass spectrometer arrangement 300. Some embodiments envision the mass spectrometer 400 comprising the heating element. The arrangement 300 further comprises a mobile carrier 102 that is configured to position the intake port 434 over the regolith 112, typically less than 12 inches.

One embodiment of the open environmental mass spectrometer arrangement 300 envisions the mass spectrometer 400 being maintained at a pressure essentially equal to that of the open environment 405.

Still other embodiments of the present invention envision a He-3 detection arrangement 200 as shown in FIGS. 2A-2E comprising a thermal neutron source 202 and a thermal neutron detector 204. More specifically, the thermal neutron source 202 can comprise a thermal neutron emitter 232 encapsulated in a hydrogen rich material 230, wherein the thermal neutron source 202 is configured to emit thermal neutrons 222 in all directions (see FIG. 2E). The thermal neutron detector 204 can be configured to detect a concentration 220 of the thermal neutrons 222. In the arrangement 200, a neutron shield 206 is interposed between the thermal neutron source 202 and the thermal neutron detector 204. The neutron shield 206 is configured to block some of the thermal neutrons 222 emitted from the thermal neutron source 202 that are aimed at the thermal neutron detector 204 (such as attenuating at least 90% of the neutrons 222 that are between the neutron shield 206 and the thermal neutron detector 204). A power source 210, such as a battery or solar system, for example, is configured to provide power to the thermal neutron source 202 and the thermal neutron detector 204. A metal plate 110 has a periphery 114, which is the sidewall boundary of the metal plate 110 shown by the four side 114. The thermal neutron source 202, the thermal neutron detector 204, and the neutron shield 206 are disposed on the metal plate 110 within the periphery 114.

A rover 102 is envisioned, in another embodiment, to support the He-3 detection arrangement 200, wherein the rover 102 positions the metal plate within 10 cm of a surface 112A of granular soil 112. The He-3 detection arrangement 200 envisions the concentration 220 being influenced by a He-3 concentration in the granular soil 112.

In another embodiment of the He-3 detection arrangement 200, the metal plate 110 is aluminum.

The He-3 detection arrangement 200 can further comprise a wireless communicator 212 and 214 that is configured to communicate the concentration 220 to a receiver, such as a receiver at a remote hub or remote station that is evaluating the concentration 220 at each location sampled (from 152 and 154 to 156, as shown in FIG. 1B). In some embodiments, the concentration 220 can be determined with respect to time.

In another embodiment of the He-3 detection arrangement 200, the metal plate 110 is at least part of a rover base of a rover 102.

The He-3 detection arrangement 200 further envisions the metal plate 110 being located less than 10 cm from a granular surface 112A when the thermal neutron source 202 is emitting the neutrons 222.

The He-3 detection arrangement 200 imagines an embodiment wherein the metal plate 110 comprises handles 224 that are configured to be carried by at least one human or robot.

The He-3 detection arrangement 200 imagines an embodiment wherein the metal plate 110 is attached to a low gravity skipper 120.

Another embodiment of the present invention envisions a He-3 detection system 200 comprising generally comprising a thermal neutron detector 204 sensing a quantity of neutrons 222 emitted from a thermal neutron source 202 to evaluate a concentration of He-3 in regolith 112 or some other granular soil. More specifically, the embodiment envisions the thermal neutron source 220 configured to emit thermal neutrons 222 in all directions wherein the thermal neutron detection system 204 is configured to detect a neutron concentration 220 of the thermal neutrons 222 backscattered from granular soil 112. A neutron shield 206 is interposed between the thermal neutron source 202 and the thermal neutron detector 204 to isolate the neutrons detected from the regolith 112 thereby assessing a quantity or concentration of He-3 in the regolith 112. A power source 210, such as a battery, can be included with the system to provide power to the thermal neutron source 202 and the thermal neutron detection system 204. The neutron shield 206, the thermal neutron source 202, and the thermal neutron detection system 204 are envisioned to be disposed on a metal plate 110 that is configured to be placed within 10 cm of a surface 112A of the granular soil 112.

The He-3 detection system 200 further imagines the neutron shield 206 being configured to block at least 90% of the thermal neutrons 222 emitted from the thermal neutron source 202, the neutrons 222 being aimed 218 at the thermal neutron detection system 204.

The He-3 detection system 200 further envisions the neutron concentration 220 that is detected by the thermal neutron detection system 204 being inversely proportional to a concentration of He-3 in the granular soil 112.

The He-3 detection system 200 envisions and embodiment where the neutron shield 206 is a boronated shield.

The He-3 detection system embodiment 200 can further comprise a transmitter 214 that is configured to transmit the neutron concentration 220 to a remote receiver.

The He-3 detection system 200 envisions mapping out a region for He-3 concentration using the He-3 detection system 200 by moving it to different locations (from 152 and 154 to 156, as shown in FIG. 1B) on the surface 112A of a celestial body 122 via transport that is selected from a group consisting of a rover 102, a low gravity skipper 120 or a robot (not shown).

The He-3 detection system 200 envisions the neutron shield 206 being at between 1 and 4 inches thick depending on the desired amount of neutron attenuation on the thermal neutron detection system side of the neutron shield 206.

Yet another embodiment of the present invention envisions an arrangement 200 that detects He-3 in regolith 112 on the Moon 122. The arrangement 220 can comprise a neutron source 202 that is configured to emit thermal neutrons 222, a neutron detector 204 that is configured to detect a neutron concentration 220 of the neutrons 222 that are backscattered 220 from the regolith 112 and a neutron shield 206 that is interposed between the neutron source 202 and the neutron detector 204. The neutron shield 206 is configured to block at least some of the neutrons 222 in a line-of-sight 218 between the neutron source 202 and the neutron detector 204. The arrangement 200 can also include a power source 210 that is configured to provide power to the thermal neutron source 202, the thermal neutron detection system 204, and a transmitter 214. The transmitter 214 is configured to transmit the neutron concentration/s 220 to a remote receive. The neutron shield 206, the thermal neutron source 202, and the thermal neutron detection system 204 are envisioned to be disposed on a metal plate 110. The arrangement 200 is further envisioned to be moved to different locations from 152 and 154 to 156, as shown in FIG. 1B) on the surface 112A of the Moon 122 via a transporter 102 or 120.

This arrangement 200 further envisions the neutron shield 206 being thick enough and comprising enough attenuating material, such as boron, to attenuate at least 95% of the neutrons 222.

In this arrangement 200 the neutron concentration 220 detected by the neutron detector 204 is inversely proportional to a concentration of He-3 in the regolith 112.

These exemplified embodiments are not exhaustive of the embodiments presented throughout the description, but rather are merely one example of a contemplated embodiment chain consistent with embodiments of the present invention. In other words, there are numerous other embodiments described herein that are not necessarily presented in the apparatus embodiment examples presented immediately above.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended embodiments are expressed. For example, the orientation of the elements and the plate can include other geometries not explicitly shown in the embodiments above while maintaining essentially the same functionality without departing from the scope and spirit of the present invention. Likewise, the materials and construction of the neutron shield can be different but serve the same purpose without departing from the scope and spirit of the present invention. It should further be appreciated that with respect to the mass spectrometer, the basic construction is well known in the art and modification to present embodiments discussed can be made once a skilled artisan is in possession of the concepts disclosed herein. Moreover, the electronics and computing that enable the functionality of the He-3 detection system are not described in detail because they either exist or are easily constructed by those skilled in the art.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. An associated particle imaging arrangement for detecting ilmenite, the associated particle imaging arrangement comprising:
   a transport comprising a top end and a bottom end, wherein the bottom end is configured to interface a surface of an extra-terrestrial body, the transport is configured to be moved in different locations on the surface of the extra-terrestrial body;
   a nanosecond neutron analysis and associated particle imaging system (NNA/API) comprising a neutron emitter configured to aim a cone of neutrons towards the surface of the extra-terrestrial body from the bottom end, the NNA/API devoid of a vacuum chamber adapted to maintain a pressure that is lower than an ambient environment to the associated particle imaging arrangement;
   at least one gamma ray detector configured to identify energy characteristics of gamma rays for titanium and/ or iron;
   a cosmic radiation shield covering the NNA/API and the at least one gamma ray detector, wherein the cosmic radiation shield configured to at least shield a portion of cosmic radiation that comprises cosmic gamma radiation and cosmic neutron radiation, the cosmic radiation shield disposed at the top end of the transport;
   an energy source configured to provide energy to the NNA/API and the at least one gamma ray detector;
   a non-transitory memory connected to the at least one gamma ray detector, the non-transitory memory configured to retain concentration information; and
   a transmitter configured to transmit the concentration information to a remote receiver.

2. The associated particle imaging arrangement of claim 1, wherein the at least one gamma ray detector is tuned to substantially detect concentrations of titanium and iron at a depth of 3 feet.

3. The associated particle imaging arrangement of claim 1, wherein the at least one gamma ray detector is within 12 inches of the surface of the extra-terrestrial body.

4. The associated particle imaging arrangement of claim 1, wherein the NNA/API and the at least one gamma ray detector comprise at least one inner chamber that is devoid of external contamination.

5. The associated particle imaging arrangement of claim 4, wherein the at least one inner chamber is at a pressure below 7 millitorr.

6. The associated particle imaging arrangement of claim 1, wherein the transport is selected from a group consisting of a rover, a dispersion pod, a skipper, or a hand-held transport.

7. The associated particle imaging arrangement of claim 1, wherein the concentration information comprises first concentration information of titanium at a first location of the extra-terrestrial body and second concentration information of titanium at a second location on the extra-terrestrial body, the associated particle imaging arrangement further comprising a computer processor that compares the first concentration information with the second concentration information.

8. The associated particle imaging arrangement of claim 1, wherein the cosmic radiation shield is metallic.

9. An ilmenite detector arrangement using associated particle imaging, the ilmenite detector arrangement comprising:
- a rover;
- a nanosecond neutron analysis and associated particle imaging system (NNA/API) comprising a neutron emitter that is configured to aim a cone of neutrons towards a surface of an extra-terrestrial body from the rover, the NNA/API devoid of a vacuum chamber;
- a gamma ray detector that detects titanium concentrations and iron concentrations, the titanium concentrations are from within 12 inches of the surface of the extra-terrestrial body, the gamma ray detector configured to detect the titanium concentrations via gamma radiation emitted from the surface of the extra-terrestrial body due to neutrons impinging the surface of the extra-terrestrial body from the cone of neutrons;
- a cosmic radiation shield covering the NNA/API and the gamma ray detector from at least a portion of cosmic gamma radiation and cosmic neutron radiation;
- a computing processor configured to determine if the titanium concentrations and the iron concentrations comprise a ratio that is consistent with ilmenite; and
- a transmitter configured to transmit the titanium concentrations and the iron concentrations to a remote receiver,
- wherein the rover configured to carry the ilmenite detector arrangement to different locations on the surface of the extra-terrestrial body.

10. The ilmenite detector arrangement of claim 9, further comprising an energy source disposed on the rover connected to and configured to provide energy to the NNA/API.

11. The ilmenite detector arrangement of claim 9, further comprising a non-transitory memory connected to the gamma ray detector that is configured to retain the information of the titanium concentrations and the iron concentrations.

12. The ilmenite detector arrangement of claim 9, further comprising other gamma ray detectors.

13. The ilmenite detector arrangement of claim 9, wherein the NNA/API and the gamma ray detector is within 12 inches from the surface of the extra-terrestrial body.

14. The ilmenite detector arrangement of claim 9, wherein the titanium concentrations and the iron concentrations comprise first concentration information of titanium at a first location of the extra-terrestrial body and second concentration information of titanium at a second location on the extra-terrestrial body, the ilmenite detector arrangement further comprising a computer processor that compares the first concentration information with the second concentration information.

15. The ilmenite detector arrangement of claim 9, wherein the NNA/API comprises at least one inner chamber is at a pressure below 7 millitorr.

16. A method comprising:
- moving a rover from a first location to a second location on the Moon;
- emitting a neutron beam of a plurality of neutrons at a surface in the first location;
- detecting gamma rays from decaying unstable titanium atoms and iron atoms bombarded with the plurality of neutrons of the neutron beam;
- determining a ratio of titanium atoms to iron atoms from gamma rays; and
- establishing that the ratio corresponds to ilmenite.

17. The method of claim 16, further comprising repeating the emitting step, the detecting step, the determining step, and the establishing step in the second location.

18. The method of claim 17, further comprising establishing a concentration of ilmenite in the first location and the second location.

* * * * *